United States Patent
Hoshino et al.

(10) Patent No.: US 9,124,325 B2
(45) Date of Patent: Sep. 1, 2015

(54) TERMINAL APPARATUS, BASE STATION APPARATUS, RETRANSMISSION METHOD AND RESOURCE ALLOCATION METHOD

(75) Inventors: Masayuki Hoshino, Kanagawa (JP); Takashi Iwai, Ishikawa (JP); Seigo Nakao, Kanagawa (JP); Daichi Imamura, Kanagawa (JP); Akihiko Nishio, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 266 days.

(21) Appl. No.: 13/805,529

(22) PCT Filed: Jun. 21, 2011

(86) PCT No.: PCT/JP2011/003525
§ 371 (c)(1),
(2), (4) Date: Dec. 19, 2012

(87) PCT Pub. No.: WO2011/161946
PCT Pub. Date: Dec. 29, 2011

(65) Prior Publication Data
US 2013/0094349 A1    Apr. 18, 2013

(30) Foreign Application Priority Data

Jun. 21, 2010  (JP) .................................. 2010-140746
Aug. 13, 2010  (JP) .................................. 2010-181343

(51) Int. Cl.
*H04L 25/03*     (2006.01)
*H04B 7/04*      (2006.01)
(Continued)

(52) U.S. Cl.
CPC ................ *H04B 7/0482* (2013.01); *H04L 1/06* (2013.01); *H04L 1/1893* (2013.01); *H04L 25/03942* (2013.01); *H04B 7/0486* (2013.01); *H04L 5/0023* (2013.01); *H04L 5/0055* (2013.01)

(58) Field of Classification Search
CPC ...... H04B 7/0482; H04B 7/0486; H04L 1/06; H04L 1/1893; H04L 25/03942; H04L 5/0023; H04L 5/0055
See application file for complete search history.

(56) References Cited

U.S. PATENT DOCUMENTS 8,594,036 B2 * 11/2013 Kang et al. ................... 370/329
8,750,219 B2    6/2014 Ishii
(Continued)

FOREIGN PATENT DOCUMENTS

JP   2010-500790 A    1/2010
WO  2009/116441 A1    9/2009

OTHER PUBLICATIONS

3GPP TS36.211, V9.1.0, 2010.03 pp. 48-52, "Physical Channels and Modulation".
(Continued)

*Primary Examiner* — Marsha D Banks Harold
*Assistant Examiner* — William Johnson
(74) *Attorney, Agent, or Firm* — Pearne & Gordon LLP

(57) ABSTRACT

This invention provides a terminal apparatus that can suppress the quality degradation caused by a propagation path variation when implementing a retransmission control method using non-adaptive HARQ in a wireless communication system utilizing the MIMO communication technique. In this apparatus, a number-of-retransmissions counting unit (105) counts a number of retransmission requests (L) for the same code word. A predetermined precoder designating unit (106) changes precoders between when the number of retransmission requests (L) is less than N and when the number of retransmission requests (L) is equal to or greater than N plus one. A PDCCH generation unit (211) determines, based on a result of comparison between the number of retransmission requests (L) for the same CW and the number of retransmission requests (N) established for the change of precoders, a precoder to be used by terminals, and further allocates, based on the determined precoder, resources to the plurality of terminals.

11 Claims, 18 Drawing Sheets

(51) Int. Cl.
*H04L 5/00* (2006.01)
*H04L 1/18* (2006.01)
*H04L 1/06* (2006.01)

(56) References Cited

U.S. PATENT DOCUMENTS

| | | |
|---|---|---|
| 2008/0002688 A1* | 1/2008 | Kim et al. .................. 370/389 |
| 2009/0046569 A1* | 2/2009 | Chen et al. .................. 370/203 |
| 2009/0150750 A1* | 6/2009 | Liu et al. .................... 714/758 |
| 2009/0235140 A1* | 9/2009 | Yue et al. .................... 714/751 |
| 2009/0262856 A1* | 10/2009 | Onggosanusi et al. ....... 375/267 |
| 2009/0307558 A1 | 12/2009 | Lee et al. |
| 2010/0098006 A1* | 4/2010 | Golitschek Edler Von Elbwart et al. .............................. 370/329 |
| 2010/0098009 A1* | 4/2010 | Higuchi ....................... 370/329 |
| 2010/0183056 A1* | 7/2010 | Hoshino ....................... 375/219 |
| 2010/0246516 A1* | 9/2010 | Pelletier et al. .............. 370/329 |
| 2011/0044275 A1 | 2/2011 | Ishii |
| 2014/0071928 A1* | 3/2014 | Papasakellariou et al. ... 370/329 |

OTHER PUBLICATIONS

3GPP TSG RAN WG1 #61, Montreal, Canada, May 10-14, 2010, Samsung, UL SU-MIMO precoding in PHICH-triggered retransmissions, R1-103035.

International Search Report for PCT/JP2011/003525 dated Aug. 2, 2011.

Ericsson, Uplink SU-MIMO in LTE-Advanced 3GPP TSG RAN WG1 #57 R1-092027, Apr. 28, 2009.

* cited by examiner

FIG.1

TERMINAL APPARATUS, BASE STATION APPARATUS, RETRANSMISSION METHOD AND RESOURCE ALLOCATION METHOD

TECHNICAL FIELD

The present invention relates to a terminal apparatus, a base station apparatus, a retransmission method and a resource allocating method which perform a retransmission control method through non-adaptive HARQ (non-adaptive hybrid auto repeat request).

BACKGROUND ART

A current MIMO communication technology is gaining attention as a technique which efficiently uses a limited frequency band and achieves fast transmission. The MIMO communication technology uses a plurality of antennas for both a base station apparatus (hereinafter, referred to as a base station) and a terminal apparatus (hereinafter, referred to as a terminal). In this MIMO communication technology, a study is made on data transmission using preceding control in a terminal. In the precoding control, the base station estimates a channel condition between the base station and the terminal, from a receiving condition of a reference signal independently transmitted from each antenna of the terminal, selects a precoder which is optimal for the estimated channel condition and applies the precoder to data transmission.

Particularly, precoding control based on a transmission rank is applied to LTE-Advanced (Long Term Evolution-Advanced). Herein, a rank refers to the number of spatial multiplexing in space division multiplexing (SDM) and is the number of independent data transmitted at the same time. To be more specific, code books having different sizes are employed for respective ranks.

FIG. 1 is a diagram showing code books corresponding to respective ranks when there are four antennas. As shown in FIG. 1, rank 1 is associated with a code book having size 24, and the code book includes twenty-four candidate precoders. Rank 2 is associated with a code book having size 16 and the code book includes six-teen candidate precoders. Rank 3 is associated with a code book having size 12 and the code book includes twelve candidate precoders. Rank 4 is associated with a code hook having size 1 and the code hook includes one candidate precoder.

The base station receives a reference signal transmitted from the terminal, estimates a channel matrix from the received signal, and selects a precoder which is optimal for the estimated channel matrix from these fifty-three candidate precoders.

In a communication path such as mobile communication, having a relatively large channel variation, a hybrid automatic repeat request (HARQ) is applied for an error controlling technique. HARQ is a technique whereby the transmitting side retransmits data, and the receiving side combines the received data and the retransmitted data to improve error correction performance and achieve high quality transmission. As a HARQ method, adaptive HARQ and non-adaptive HARQ are under study. Adaptive HARQ is a method for allocating retransmitted data to any resource. On the other hand, non-adaptive HARQ is a method for allocating retransmitted data to predetermined resources. In an uplink of LTE, the non-adaptive HARQ scheme is employed among HARQ schemes.

A non-adaptive HARQ scheme will be described with reference to FIG. 2. In non-adaptive HARQ, the base station determines resources for allocating data in the first data allocation. The base station then reports transmission parameters to a terminal through a downlink control channel (PDCCH: Physical Downlink Control Channel). The transmission parameters include information such as allocated frequency resources indicating information on resource allocation, a transmission rank number, a precoder, and a modulation scheme/a coding rate. The terminal acquires the transmission parameters transmitted through the PDCCH and transmits first data, using a predetermined resource in accordance with the aforementioned resource allocation information.

The base station receives the first data and reports, to the terminal, a NACK corresponding to data which could not be demodulated in the first data, through a HARQ reporting channel (PHICH: Physical Hybrid-ARQ Indicator Channel). The terminal receives the NACK and controls retransmission by using the transmission parameters reported through the PDCCH, the parameters including information resource allocation and the like. Specifically, the terminal generates and transmits retransmission data, using an allocation frequency, a precoder, a modulation scheme, and the like, which are the same as those in the first transmission. The terminal changes an RV (Redundancy Version) parameter depending on the number of retransmission requests. The RV parameter represents a reading position in a memory (referred to as a circular buffer) for storing Turbo-coded data. For example, when the memory is equally divided into approximately four regions and tops of the areas are assigned zero, one, two, and three respectively, the terminal changes an RV parameter (a reading position) in order of zero, two, one, three, and zero depending on the number of retransmission requests.

Non-adaptive HARQ is often used together with Synchronous HARQ employing the constant transmission interval. In LTE, retransmission data is retransmitted eight subframes after the report of the NACK.

Non-adaptive HARQ is performed on a per predetermined control unit basis, the control unit is referred to as a codeword (CW). The CW is a control unit to which the same modulation scheme and coding rate are applied. As with the CW processed in a physical layer dealing with modulation or coding, the control unit may be referred to as a transport block (TB) since the control unit is processed in a MAC layer dealing with HARQ, and the CW may be distinguished from the TB. The present embodiment however employs uniform notation "CW" without a distinction therebetween hereafter.

In LTE, the transmission of one CW is generally applied to rank 1 (in transmission in a single rank) in the first transmission, and the transmission of two CWs is applied to ranks 2, 3, and 4 (in transmission in multiple ranks) in the first transmission. In the transmission in multiple ranks, CW0 is allocated to Layer 1 and CW1 is allocated to Layer 2 in rank 2. In rank 3, CW0 is allocated to Layer 1, and CW1 is allocated to Layer 2 and Layer 3. In rank 4, CW0 is allocated to Layer 1 and Layer 2, and CW1 is allocated to Layer 3 and Layer 4.

When retransmitting only CWs allocated to a plurality of layers, the terminal transmits one CW at a time in rank 2. To be More specific, when retransmitting CW1 in rank 3 and CW0 or CW1 in rank 4, the terminal transmits these CWs as one CW in rank 2.

Since the base station includes a larger number of antennas compared to the terminal, the base station is flexibly installed relatively. For this reason, a so-called multiuser MIMO, which assigns the same resource to a plurality of terminals, can be applied through an adequate process on a received signal in the base station. An example case will be described where the same resource is allocated to two terminals through the terminal having one transmitting antenna and the base station having two receiving antennas. This case can be equivalently treated as a MIMO channel with two transmitting antennas and two receiving antennas, and the base station can process a received signal. To be more specific, the base station performs a general MIMO received-signal process such as spatial filtering, canceller, and maximum likelihood estimation, thereby detecting respective signals transmitted from a plurality of terminals. With multiuser MIMO, the base station estimates interference values between terminals based on the channel condition between the base station and each terminal, and sets transmission parameters for the respective terminals by considering interference values, in order to more stably operate a communication system.

In non-adaptive HARQ, the base station sets transmission parameters in only resource allocation and the terminal transmits retransmission data, using a predetermined resource as described above. Accordingly, it is difficult for the base station to indicate an adequate precoder to the terminal at any timing. When retransmitting only a part of the first transmission data, the terminal may retransmit the data in a rank different from one reported in the first data allocation through PDCCH. Accordingly, such a case requires a rule for a rank in retransmission.

In a case of applying multiuser MIMO, the base station needs to estimate interference values between terminals upon resource allocation. Information of a precoder is required for estimating interference values between terminals. Using any precoder in the terminal in retransmission makes complicated the calculation of interference values between terminals in the base station.

Non-Patent Literature 1 discloses a technique to solve these problems. To be more specific, Non-Patent Literature 1 discloses a scheme which uses the same precoder for retransmission as that used in the previous transmission.

The scheme disclosed in Non-Patent Literature 1 will be described with reference to FIG. 3. FIG. 3 is a diagram showing a precoder used for the first transmission and retransmission in a case where a terminal has four transmitting antennas and transmits data in rank 3. FIG. 3 is an example where the base station selects a precoder of Index 0 (see FIG. 1) from the rank-3 codebook in first transmission. In this example, a case will be described where the base station could demodulate only one of a data sequence (CW0) transmitted in Layer 1 and data sequences (CW1) transmitted in Layer 2 and Layer 3 from the terminal.

(Case 1) A case where the base station could not demodulate CW0 but could demodulate CW1 (NACK, ACK). In this case, the base station transmits a NACK as a response signal to CW0 to instruct CW0 to be retransmitted, and transmits an ACK as a response signal to CW1 to instruct the transmission of CW1 to be stopped. These ACK and NACK are transmitted from the base station to the terminal through a PHICH.

In the scheme disclosed in Non-Patent Literature 1, the same precoder as one used in the previous transmission is applied to CW0 with response of the retransmission request (NACK). Accordingly, the terminal retransmits retransmission data corresponding to CW0, using only a part corresponding to Layer 1 in retransmission, the part being enclosed by a solid line, in a precoder of Index 0 in rank 3. The terminal changes an RV parameter between previous transmission and current transmission, and transmits the retransmission data.

(Case 2) A case where the base station could demodulate CW0 and could not demodulate CW1 (ACK, NACK). In this case, the base station transmits an ACK as a response signal to CW0 to instruct the transmission of CW0 to be stopped, and transmits an NACK as a response signal to CW1 to instruct CW1 to be retransmitted. These ACK and NACK are transmitted from the base station to the terminal through PHICH as with case 1.

In the scheme disclosed in Non-Patent Literature 1, the same precoder as one used in the previous transmission is applied to CW1 with response of the retransmission request (NACK). Accordingly, the terminal retransmits retransmission data corresponding to CW1, using only a part corresponding to Layer 2 and Layer 3 in retransmission, the part being enclosed by a dotted line, in a precoder of Index 0 in rank 3. The terminal changes an RV parameter between the previous transmission and the current transmission and transmits the retransmission data as with Case 1.

CITATION LIST

Non-Patent Literature

NFL 1
R1-103035, "UL SU-MIMO precoding in PHICH-triggered retransmissions," Samsung

SUMMARY OF INVENTION

Technical Problem

The scheme disclosed in Non-Patent Literature 1, however, has the following problem. As shown in FIG. 3, the precoder indicated through the PDCCH from the base station to the terminal in the first transmission is selected based on channel condition H $\{n-(4+\alpha)\}$, which is four or more subframes before the n-th subframe in which data transmission is actually performed. Since there is a time lag corresponding to about four subframes from the time at which transmission parameters including information on the selected precoder is reported to the terminal, to the time at which data is actually transmitted from the terminal, a precoder is selected in accordance with the channel condition which is four or more subframes before. In non-adaptive HARQ used together with synchronous HARQ, when. N retransmission occurs, the terminal continues to use an precoder optimized in channel condition H $\{n-(4+\alpha)\}$, in channel condition H $\{n+8\cdot N\}$. The difference between channel condition H $\{n+8\cdot N\}$ in retransmission and channel condition H $\{n-(4+\alpha)\}$ in selecting a precoder increases with an increase in number N of retransmission requests, which may cause quality degradation.

The present invention has been implemented taking into account the problems described above, and it is an object of the present invention to provide a terminal apparatus, a base station apparatus, a retransmission method, and a resource allocation method that can suppress quality degradation associated with a channel variation in a case of performing a retransmission control method using non-adaptive HARQ in a radio communication system using a MIMO communication technique.

Solution to Problem

A terminal apparatus according to an aspect of the present invention employs a configuration to include a codeword generating section that encodes a data sequence to generate codewords; a receiving section that receives a response signal indicating a retransmission request for the codewords, the response signal being allocated to a response resource; an instructing section that instructs a precoder to be switched based on the number of retransmission requests for the same codeword or a switch instructing signal reported using the response resource; a precoding section that precodes the codeword using the precoder, based on the instruction to switch the precoder; and a transmitting section that transmits the precoded codeword.

A base station apparatus according to an aspect of the present invention employs a configuration to include a receiving section that receives codewords precoded by a precoder; a detecting section that detects an error of the received codewords; a response signal generating section that allocates a response signal indicating a result of error detection for the codewords to a response resource; and a schedule control section that identifies the precoder depending on the number of retransmission requests for the same codeword or a channel condition, and allocates resources to a plurality of terminal apparatuses based on the identified precoder.

A method of retransmission according to an aspect of the present invention employs a configuration to include the steps of: encoding a data sequence to generate codewords; receiving a response signal indicating a retransmission request for the codewords, the response signal being allocated to a response resource; instructing a precoder to be switched based on the number of retransmission requests for the same codeword or a switch instructing signal reported using the response resource; precoding the codeword using the precoder, based on the instruction to switch the precoder; and transmitting the precoded codeword.

A method of allocating resources according to an aspect of the present invention employs a configuration to include the steps of: receiving codewords preceded by a precoder; detecting an error of the received codewords; allocating a response signal indicating a result of error detection for the codewords to a response resource; and identifying the precoder depending on the number of retransmission requests for the same codeword or a channel condition, and allocates resources to a plurality of terminal apparatuses based on the identified precoder.

Advantageous Effects of Invention

According to the present invention, it is possible to suppress quality degradation associated with a channel variation in a case of performing a retransmission control method using non-adaptive HARQ in a radio communication system using a MIMO communication technique.

BRIEF DESCRIPTION OF DRAWINGS

FIG. 1 is a diagram showing code books corresponding to respective ranks when there are four antennas;

DESCRIPTION OF EMBODIMENTS

Embodiments of the present invention will now be described in detail with reference to the drawings.

Embodiment 1

Figure 2:
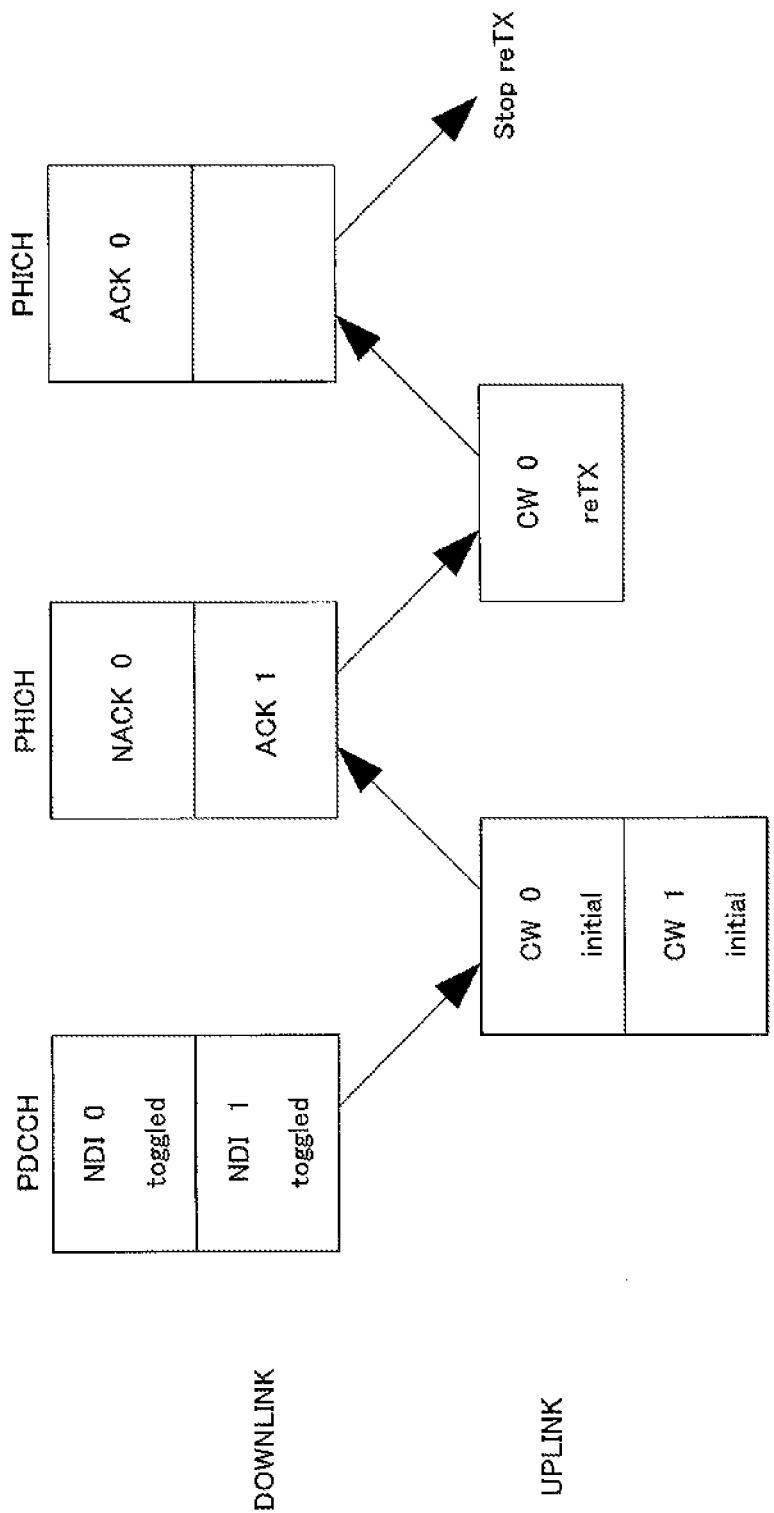
FIG. 2 illustrates a non-adaptive HARQ scheme.
Figure 3:
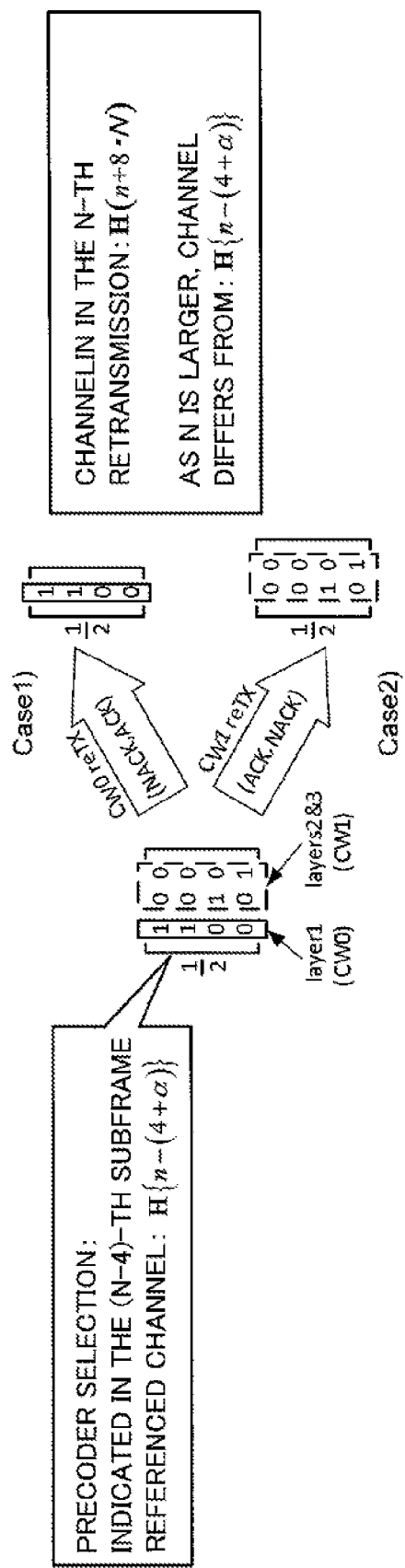
FIG. 3 illustrates the scheme disclosed in Non-Patent Literature 1.
Figure 4:
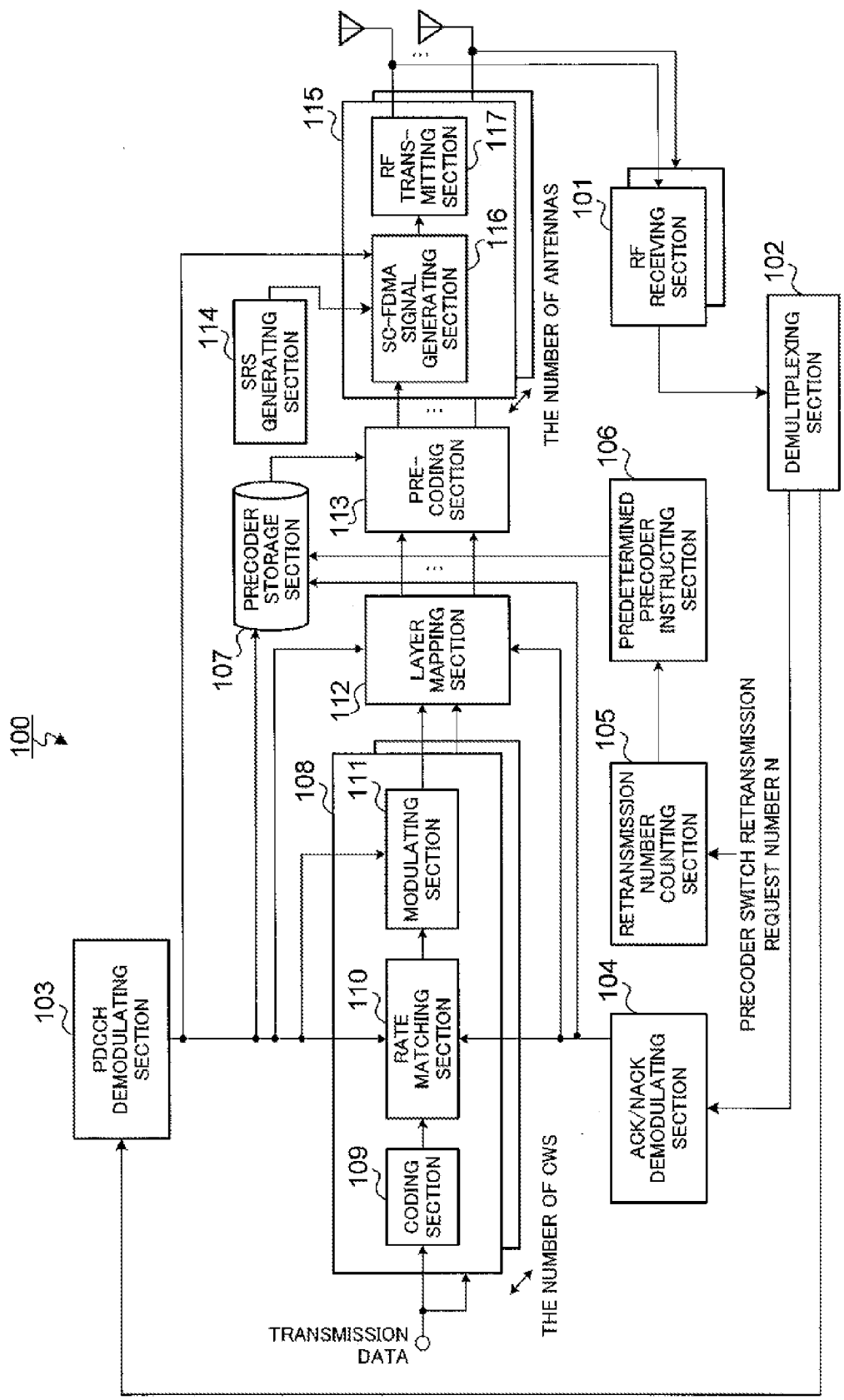
FIG. 4 is a block diagram showing a configuration of main components of a transmitting apparatus according to Embodiment 1 of the present invention.

FIG. 4 is a block diagram showing a configuration of main components of a transmitting apparatus according to the present embodiment. Transmitting apparatus 100 in FIG. 4 is applied to, for example, an LTE-Advanced terminal. In order to avoid complicated explanation, FIG. 4 shows components associated with transmission of uplink data which is closely related to the present invention and components associated with reception of downlink response signals to that uplink data, and the illustration and explanation of components associated with reception, of downlink data will be omitted.

RF receiving section 101 receives a signal transmitted from a base station through an antenna, transforms the received signal into a baseband signal through a radio receiving process (downconvert, Fourier transform, P/S (Parallel/Serial) transform and the like), and outputs the transformed baseband signal to demultiplexing section 102.

Demultiplexing section 102 extracts a PDCCH and a PHICH from the baseband signal. Demultiplexing section 102 then outputs the PDCCH to PDCCH demodulating section 103 and outputs the PHICH to ACK/NACK demodulating section 104.

PDCCH demodulating section 103 demodulates transmission parameters determined in the base station, from the PDCCH outputted from demultiplexing section 102 and outputs the demodulated transmission parameters to rate matching section 110, modulating section 111, layer mapping section 112, precoder storage section 107, and SC-FDMA signal generating section 116.

ACK/NACK demodulating section 104 demodulates ACK/NACK information indicating a result of error detection of a received signal in the base station for each CW, from the PHICH outputted from demultiplexing section 102 and outputs the demodulated ACK/NACK information to rate matching section 110, layer mapping section 112, precoder storage section 107, and retransmission number counting section 105.

When a NACK is outputted from ACK/NACK demodulating section 104 as ACK/NACK information for each CW, retransmission number counting section 105 increments the number of retransmission requests for each CW and stores the number in the interior. In other words, retransmission number counting section 105 counts retransmission request number L and stores counted retransmission request number L for each CW. Retransmission number counting section 105 receives, information on number N of precoder switch retransmission requests (hereinafter, referred to as "precoder switch retransmission request number N") which is previously reported from the base station separately. Precoder switch retransmission request number N will be described hereinafter.

Retransmission number counting section 105 compares precoder switch retransmission request number N with retransmission request number L which is counted and stored in the interior for each CW. Retransmission number counting section 105 outputs an instruction signal for switching a precoder to predetermined-precoder instructing section 106 when L exceeds N.

Predetermined-precoder instructing section 106 stores, in the interior, precoder information which is previously determined between the terminal and the base station separately. Predetermined-precoder instructing section 106 outputs the precoder information to precoder storage section 107 to switch a precoder when an instruction signal for switching the precoder is reported from retransmission number counting section 105. Precoder information can be provided using an index which identifies one of candidate precoders shown in FIG. 1, for example.

Figure 1:
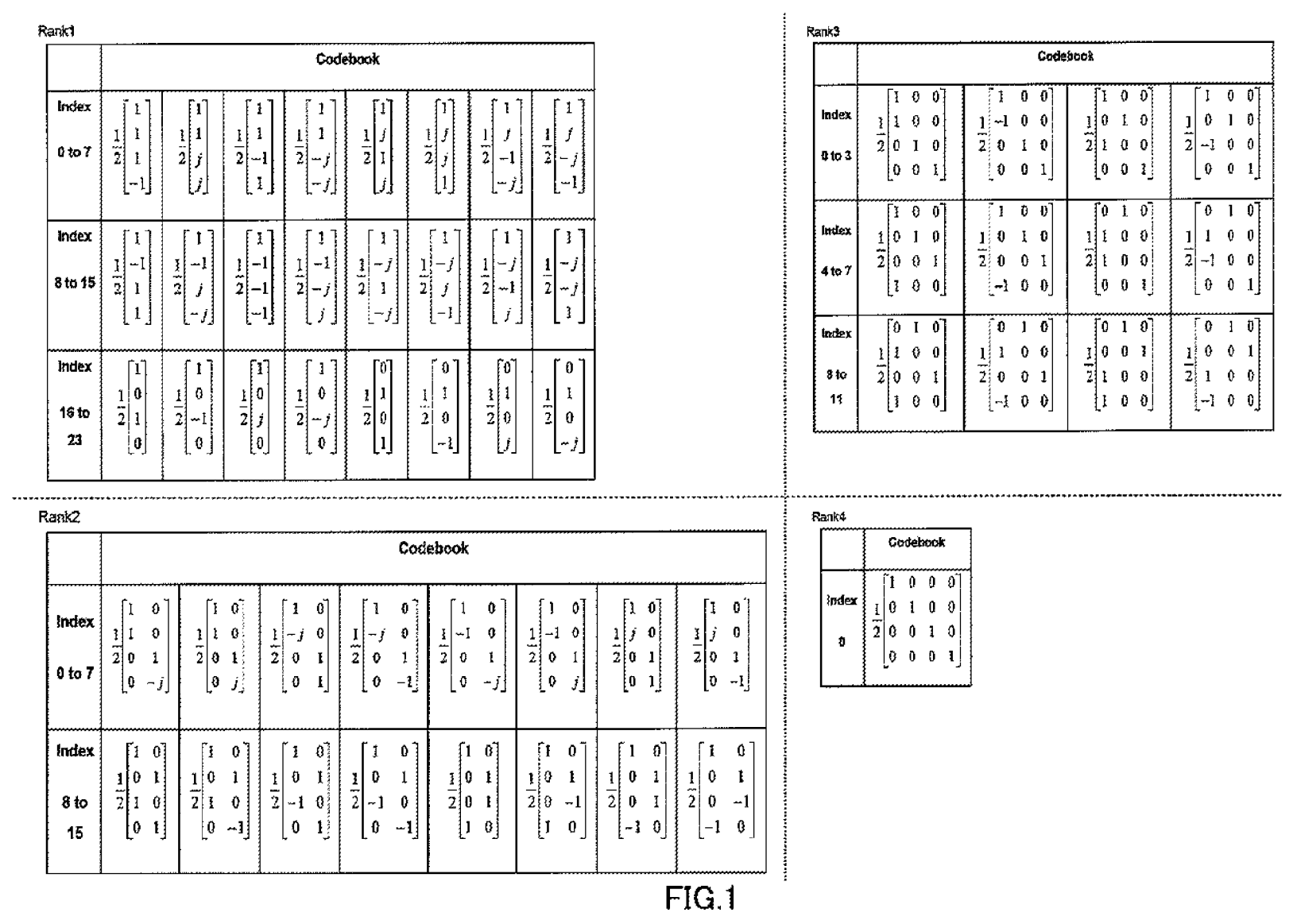

Precoder storage section 107 stores codebooks. As shown in FIG. 1, the codebook stores candidate precoders (the precoder is referred to as a precoding matrix) which are used in precoding section 113 described later. Precoder storage section 107 outputs the a rank number and precoder information which are included in the transmission parameters reported from PDCCH demodulating section 103, or a precoder corresponding to the precoder information reported from predetermined-precoder instructing section 106, to precoding section 113. To be more specific, when no precoder information is reported from predetermined-precoder instructing section 106, precoder storage section 107 outputs a precoder corresponding to the rank number and the precoder information which are reported from PDCCH demodulating section 103, to precoding section 113. When precoder information is reported from predetermined-precoder instructing section 106, precoder storage section 107 outputs a precoder indicated, by the precoder information to precoding section 113.

Codeword generating section 108 includes coding section 109, rate matching section 110, and modulating section 111.

Coding section 109 receives transmission data, performs CRC (Cyclic Redundancy Checking) on the transmission data, encodes the data to generate coded data, and outputs the generated coded data to rate matching section 110.

Rate matching section 110 includes a buffer and stores the coded data in the buffer. Rate matching section 110 then performs a rate matching process on the coded data based on the transmission parameters outputted from PDCCH demodulating section 103 to adaptively adjust an M-ary modulation value or a coding rate. Rate matching section 110 outputs the coded data subjected to the rate matching process to modulating section 111. In retransmission, rate matching section 110 reads a predetermined amount of coded data depending on the M-ary modulation value and the coding rate as retransmission data, from the starting position in the buffer indicated by the RV parameter outputted from PDCCH demodulating section 103. Rate matching section 110 then outputs the read retransmission data to modulating section 111.

Modulating section 111 performs an M-ary modulation on the coded data based on the transmission parameters outputted from PDCCH demodulating section 103 to generate modulated signals and outputs the generated modulated signal to layer mapping section 112.

Layer mapping section 112 maps the modulated signals outputted from modulating section 111 to each layer for each CW and outputs the mapped CWs to precoding section 113.

Precoding section 113 precedes the CWs using the precoder reported from precoder storage section 107, to apply a weight to each CW. Precoding section 113 then outputs precoded CWs to SC-FDMA (Single Carrier Frequency Division Multiple Access) signal generating section 116.

SRS (Sounding Reference Signal) generating section 114 outputs a reference signal (SRS: Sounding Reference Signal) to SC-FDMA signal generating section 116.

Transmitting process section 115 includes SC-FDMA signal generating section 116 and RF transmitting section 117.

SC-FDMA signal generating section 116 performs SC-FDMA modulation on the reference signal (SRS:Sounding Reference Signal) outputted from SRS generating section 114 or the pre-coded CW to generate an SC-FDMA signal. SC-FDMA signal generating section 116 outputs the generated SC-FDMA signal to RF transmitting section 117. RF transmitting section 117 performs a radio transmitting process (S/P (Serial/Parallel) transform, inverse Fourier transform, upconvert, amplification, and the like) on the SC-FDMA signal and transmits the signal subjected to the radio transmitting process through transmitting antennas. In view of the above, the first transmission data or retransmission data is transmitted to the receiving apparatus.

Figure 5:
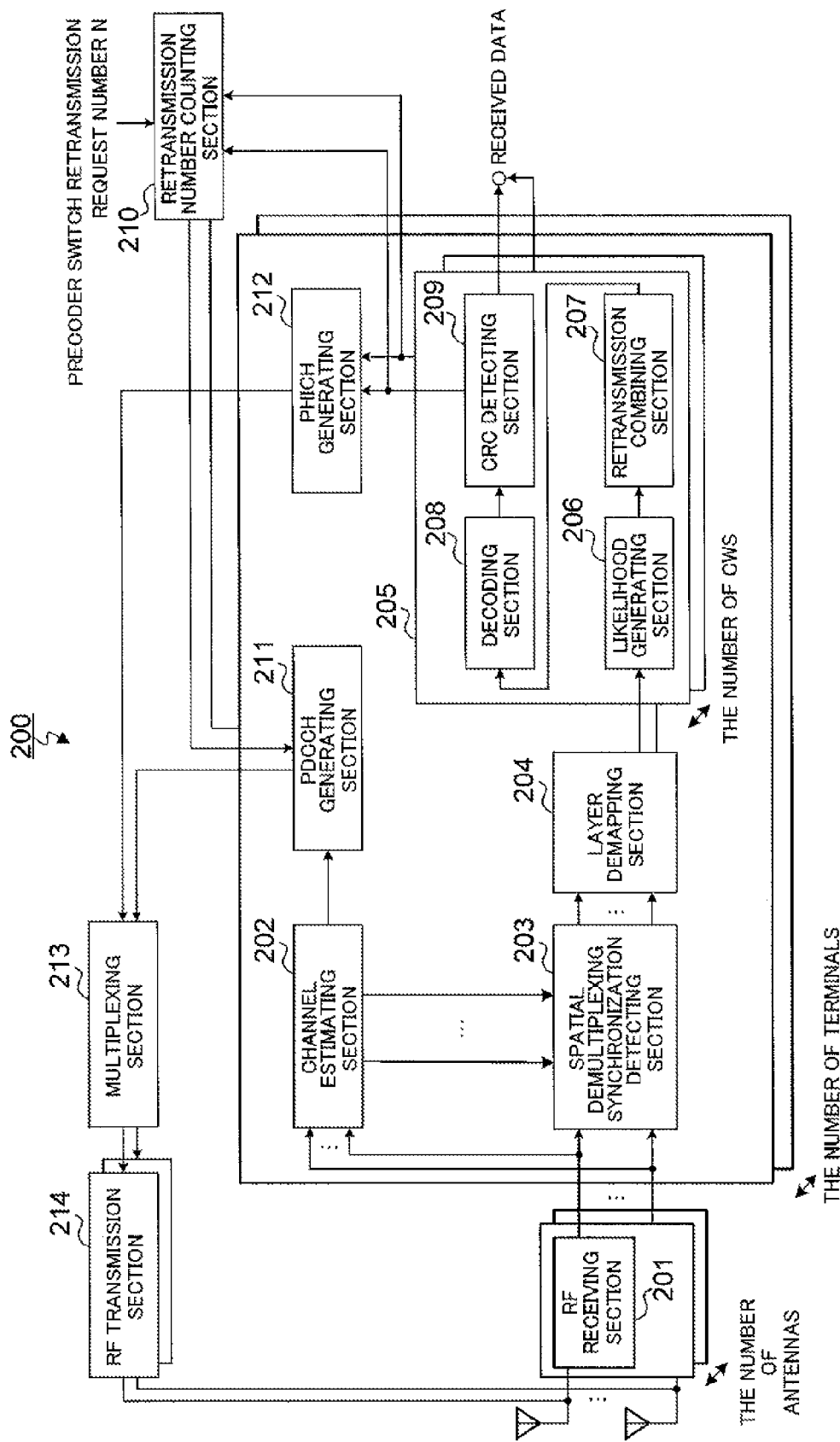
FIG. 5 is a block diagram showing a configuration of main components of a receiving apparatus according to Embodiment 1.

FIG. 5 is a block diagram showing a configuration of main components of a receiving apparatus according to the present embodiment. Receiving apparatus 200 in FIG. 5 is applied to, for example, an LIE-Advanced base station. Note that, to avoid complication of explanation. FIG. 5 shows components associated with reception of uplink data which is closely related to the present invention and components associated with transmission of downlink response signals to that uplink data, and illustration and explanation of components associated with transmission of downlink data will be omitted.

RF receiving section 201 receives a signal transmitted from a terminal through antennas, transforms the received signal into a baseband signal through a radio receiving process (downconvert, Fourier transform, P/S transform and the like), and outputs the transformed baseband signal to channel estimating section 202 and spatial demultiplexing synchronization detecting section 203.

Channel estimating section 202 performs channel estimation based on a reference signal included in the baseband signal and calculates a channel estimation value. Channel estimating section 202 outputs the calculated channel estimation value to PDCCH generating section 211 and spatial demultiplexing synchronization detecting section 203.

Spatial demultiplexing synchronization detecting section 203 demultiplexes the baseband signals mapped to a plurality of layers, using the channel estimation value and outputs the demultiplexed baseband signals to layer demapping section 204.

Layer demapping section 204 combines the demultiplexed baseband signals for each CW and outputs the combined CW to likelihood generating section 206.

Error detecting section 205 includes likelihood generating section 206, retransmission combining section 207, decoding section 208, and CRC detecting section 209.

Likelihood generating section 206 calculates a likelihood for each CW and outputs the calculated likelihood to retransmission combining section 207.

Retransmission combining section 207 stores past likelihoods for each CW and performs a retransmission-combining process on the retransmission data, based on the RV parameter and outputs the combining-processed likelihood to decoding section 208.

Decoding section 208 decodes a likelihood obtained through the retransmission-combining process to generate decoded data and outputs the generated decoded data to CRC detecting section 209.

CRC detecting section 209 performs an error detecting process by CRC on the decoded data outputted from decoding section 208 and outputs the result of error detection for each CW to PHICH generating section 212 and retransmission number counting section 105. CRC detecting section 209 outputs the decoded data as received data.

When NACK is outputted from CRC detecting section 209 as the result of error detection for each CW, retransmission number counting section 210 increments the number of retransmission requests for each CW and stores the number in the interior. In other words, retransmission number counting section 210 counts retransmission request number L for each CW and stores counted retransmission request number L. Retransmission number counting section 210 receives, information on the number of precoder switch retransmission request number N which is shared with the terminal in advance. Precoder switch retransmission request number N will be described hereinafter.

Retransmission number counting section 210 compares precoder switch retransmission request number N with retransmission request number L which is counted for each CW and stored in the interior, and determines whether or not a precoder used in the terminal is switched, based on the comparison result. Specifically, when L exceeds N, retransmission number counting section 210 determines that the precoder used in the terminal is switched. When determining that the precoder used in the terminal is switched, retransmission number counting section 210 reports an instruction signal for switching a precoder to PDCCH generating section 211.

PDCCH generating section 211 determines whether the terminal uses a precoder indicated in resource allocation or a predetermined precoder, depending on whether or not the instruction signal for switching a precoder is inputted from retransmission number counting section 210. As described above, the instruction signal for switching a precoder is reported based on retransmission request number L. In other words, PDCCH generating section 211 specifies a precoder used in the terminal depending on the number of retransmission requests.

PDCCH generating section 211 estimates a channel condition based on the channel estimation value calculated in channel estimating section 202. PDCCH generating section 211 then determines transmission parameters of the plurality of terminals, based on a channel condition and the specified precoder. PDCCH generating section 211 allocates the determined transmission parameter to a PDCCH and outputs the generated PDCCH to multiplexing section 213. In other words, PDCCH generating section 211 performs a control as a scheduler and functions as a schedule control section to allocate resources to the plurality of terminals.

PHICH generating section 212 allocates ACK/NACK information indicating the result of error detection to a PHICH for each CW. The PHICH is provided with an ACK/NACK resource as a response resource for each CW. PHICH generating section 212 allocates an ACK to an ACK/NACK resource corresponding to CW0 when the result of error detection with respect to CW0 indicates the absence of an error, and allocates a NACK to the ACK/NACK resource corresponding to CW0 when the result of error detection with respect to CW0 indicates the presence of an error. PHICH generating section 212 allocates an ACK to an ACK/NACK resource corresponding to CW1 when the result of error detection with respect to CW1 indicates the absence of an error, and allocates a NACK to the ACK/NACK resource corresponding to CW1 when the result of error detection with respect to CW1 indicates the presence of an error. In view of the above, PHICH generating section 212 functions as a response signal generating section, allocates an ACK or a NACK to a response resource provided in the PHICH for each CW and outputs the generated. PHICH to multiplexing section 213.

Multiplexing section 213 multiplexes signals including the PDCCH, the PHICH and the like, and outputs the multiplexed signal to RF transmitting section 214.

RF transmitting section 214 performs a radio transmitting process (S/P transform, inverse Fourier transform, upconvert, amplification and the like) on the multiplexed signal and transmits the signal subjected to the radio transmitting process, through transmitting antennas. Accordingly, transmission parameters and ACK/NACK information for each CW is transmitted to the terminal.

The operations of the transmitting apparatus (hereinafter, referred to as "a terminal") and the receiving apparatus (hereinafter referred to as "a base station") configured as described above will now be described.

The base station reports control information including precoder switch retransmission request number N to the terminal in advance. The terminal beforehand identifies precoder switch retransmission request number N, from the control information which is separately reported from the base station. A method of adequately setting precoder switch retransmission request number N w it be described hereinafter.

The terminal transmits a reference signal (SRS: Sounding Reference Signal) for estimating a channel condition (for measuring channel quality) in accordance with an instruction from the base station.

The base station receives the reference signal and determines transmission parameters such as an allocation frequency resource (an allocation resource block), a transmission rank number, a precoder, a modulation scheme, and a coding rate, based on the result of the measurement of the received signal. The base station reports the determined transmission parameters to the terminal through PDCCH. The terminal needs time corresponding to about four subframes to generate transmission data in LTE, for example. Thus, the base station needs to report resource allocation in the (n−4)-th subframe in order to generate transmission data transmitted in the n-th subframe. Therefore, the base station determines and reports transmission parameters based on a channel condition in the (n−4)-th subframe.

The terminal extracts the transmission parameters from the PDCCH, generates a transmission signal transmitted from each transmitting antenna, based on the extracted transmission parameters, and transmits the generated transmission signal to the base station.

The base station performs a receiving process on the transmission signal transmitted from the terminal in the n-th subframe and generates the PHICH based on the result of error detection for each CW.

The terminal refers to the PDCCH and the PHICH at a timing when the result of error detection is reported from the base station (in this case, the (n+4)-th subframe in LTE). The PHICH includes an instruction for HARQ.

When detecting an ACK from the PHICH, the terminal determines that the base station could successfully demodulate the corresponding CW and stops retransmission of the CW. On the other hand, when not detecting an ACK in the PHICH, the terminal determines that the base station could not demodulate the corresponding CW and instructs the CW to be retransmitted, and retransmits the CW at predetermined timing.

According to the aforementioned example, when not detecting an ACK corresponding to a CW transmitted in the n-th subframe, the terminal transmits retransmission data of the CW in the n+8-th subframe. The terminal uses a predetermined value corresponding to the number of retransmission requests for an RV parameter as described above, but uses the same precoder as one indicated in the (n−4)-th subframe.

The terminal repeats a retransmitting process after the transmission parameters including resource allocation information is reported from the base station through the PDCCH. When retransmission request number L is within precoder switch retransmission request number N, the terminal continues retransmission using the same precoder as one in the previous transmission until the result of error detection with respect to the corresponding CW is determined to be an ACK. On the other hand, when retransmission request number L reaches precoder switch retransmission request number N, an ACK, is not detected, and the (N+1)-th retransmission is performed, the terminal reads a predetermined precoder, switches a precoder used for precoding to the predetermined precoder, and transmits retransmission data. After that, the terminal continues retransmission using the predetermined precoder until the result of error detection with respect to the corresponding CW is determined to be an ACK. A method of setting the predetermined precoder will be described hereinafter.

When the result of error detection of a CW indicates the absence of an error, the base station reports an ACK to the terminal, through a PHICH and instructs the transmission of the corresponding CW to be stopped. When the result of error detection of a CW indicates the presence of an error, the base station reports a NACK to the terminal through the PHICH. The base station performs a retransmission combining process and repeats a demodulating process. In this process, when retransmission request number L is within precoder switch retransmission request number N, the base station continues to transmit the NACK through the PHICH until the base station can demodulate the corresponding CW with no error. When retransmission request number L is N+1, the base station determines that the terminal uses the predetermined precoder, and performs a demodulating process and resource allocation to at least one of the other terminals which correspond to the predetermined precoder.

A method of setting precoder switch retransmission request number N will be described. Precoder switch retransmission request number N may be set, for example, based on a fading period corresponding to the moving speed of the terminal. An example case will be described where a communication system is operated such that precoder switch retransmission request number N is optimal when the moving speed of the terminal is 3 km/h. In this case, a target time required for the process from the setting of the precoder to switching of the precoder is assumed to be 36 ms equivalent to 20% of a fading period corresponding to 3 km/h. Precoder switch retransmission request number N is set to four for operation, taking into account the fact that one subframe length is 1 ms and retransmission data is controlled to be retransmitted eight subframes after the reporting of the NACK.

In other words, the terminal continues to use a precoder indicated in the (n−4)-th subframe through the PDCCH until the fourth retransmission, i.e., the (n+8×4[n+32])-th subframe, and switches a precoder to use the predetermined precoder after the fourth retransmission. Consequently, the terminal uses the precoder indicated for first transmission data through the PDCCH within the target time of 36 ms and then uses the predetermined precoder after a time of 36 ms elapses.

A method of switching the precoder will be described. As an example method of switching a precoder, a case will be described where the base station reports transmission of two CWs and rank number 3 to the terminal through the PDCCH.

Figure 6:
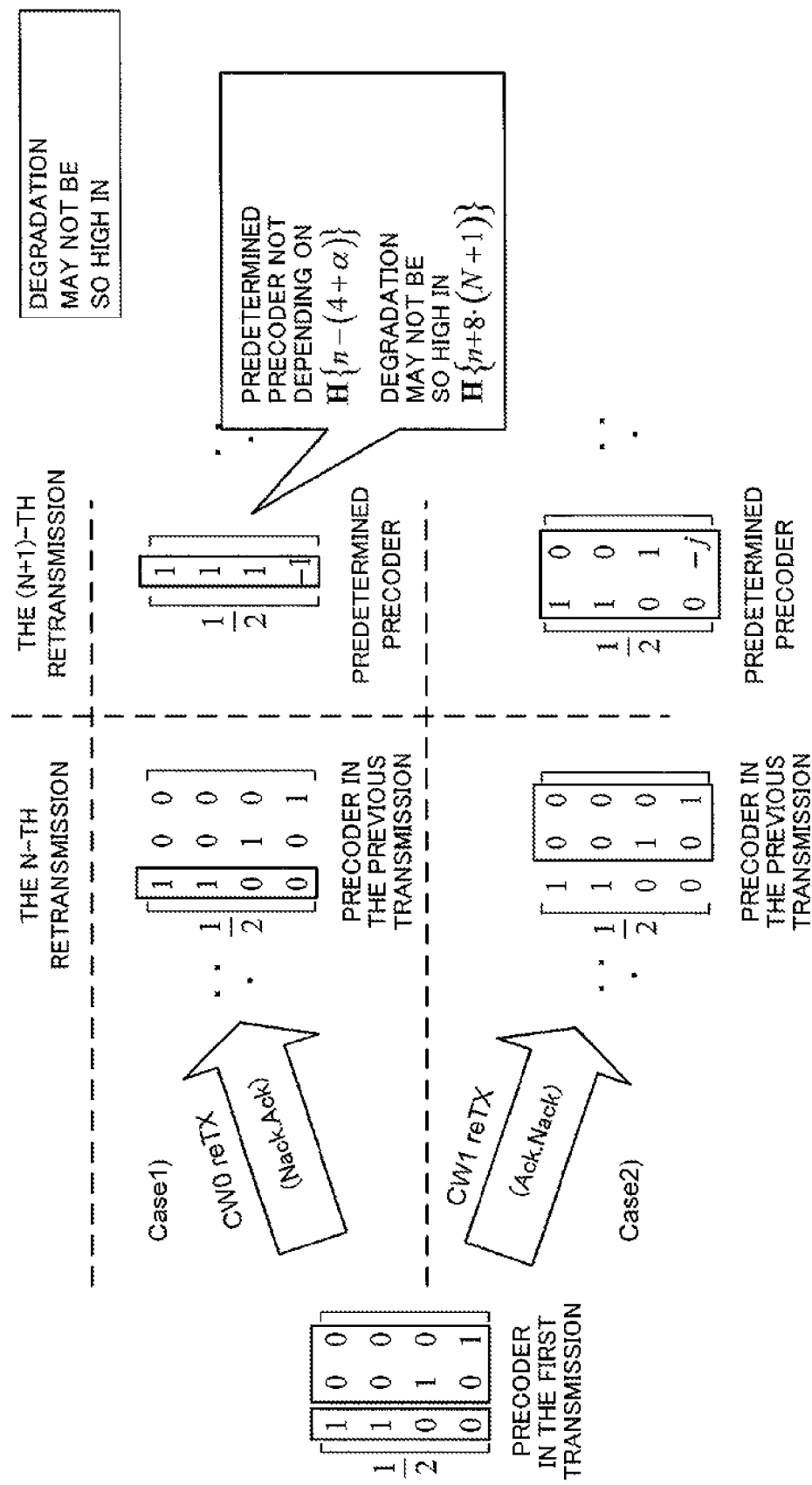
FIG. 6 illustrates a method of switching a precoder.

In FIG. 6, case 1 shows switching of a precoder in a case where the base station demodulates transmission data (CW0 and CW1) transmitted from the terminal, and results in success in demodulation of only CW1 and failure in demodulation of CW0. In FIG. 6, case 2 shows the switch of a precoder in a case where the base station demodulates transmission data (CW0 and CW1) transmitted from the terminal, and results in success in demodulation of only CW0 and failure in demodulation of CW1. FIG. 6 illustrates an example case of using a precoder of Index 0 in Rank 3 as a precoder in the first transmission. The precoder in the first transmission is used until the N-th retransmission. In the precoder of Index 0 in Rank 3, which is used from the first transmission to the N-th retransmission, Layer 1 used for CW0 is assigned to the first and the second antennas. Layer 2 used for CW1 is assigned to only the third antenna, and Layer 3 used for CW1 is assigned to only the fourth antenna.

In case 1, the terminal uses the same precoder (the framed portion in FIG. 6) as one corresponding to Layer 1 used for retransmitting corresponding CW0 until the N-th retransmission, and switches a precoder to a predetermined precoder after the (N+1)-th retransmission. FIG. 6 illustrates an example case of using the precoder of Index 0 in Rank 1 after the (N+1)-th retransmission.

In case 2, the terminal uses the same precoder (the framed portion in FIG. 6) as one corresponding to Layer 2 and Layer 3 used for retransmitting corresponding CW1 until the N-th retransmission, and switches a precoder to a predetermined precoder after the (N+1)-th retransmission. In FIG. 6 illustrates an example case of using the precoder of Index 0 in Rank 2 after the N-th retransmission.

The precoder which is optimal for channel condition H{n−(4+α)} is selected as a precoder used until the N-th retransmission, so as to be optimal in the (n−4)-th subframe. In example case 1 in FIG. 6, the precoder used until the N-th retransmission has respective elements equal to 1 for the first and the second antennas to which Layer 1 is assigned, and no phase rotation is applied to the precoder. In case 2, the precoder used until the N-th retransmission has respective elements equal to 1 for the third antenna to which Layer 2 is assigned and for the fourth antenna to which Layer 3 is assigned, and includes no phase rotation applied to the third antenna and the fourth antenna.

In case 1, the precoder used after the (N+1)-th retransmission has respective elements equal to 1 for the first antenna to the third antenna to which Layer 1 is assigned, and has an element equal to −1 for the fourth antenna to which Layer 1 is assigned. In this case, the used precoder includes phase rotation applied to only the fourth antenna. In case 2, the precoder used after the (N+1)-th retransmission has respective elements equal to 1 for the first and the second antenna to which Layer 2 is assigned and for the third antenna to which Layer 3 is assigned, and has an element equal to −j for the fourth antenna to which Layer 3 is assigned. In this case, the used precoder includes phase rotation applied to only the fourth antenna. Accordingly, different phase rotation is applied to antennas to which the same layer is assigned after the (N+1)-th retransmission. This can prevent an influence due to the directivity having higher sensitivity in a specific direction produced by the application of only the same phase rotation, as much as possible.

Channel condition H {n+8·(N+1)} after the (N+1)-th retransmission is assumed to vary from channel condition H {n−(4+α)} upon the selection of a precoder in the base station. Accordingly, it is unlikely that the precoder is still optimal after the (N+1)-th retransmission. As shown in FIG. 6, the terminal switches a precoder to a predetermined precoder after the (N+1)-th retransmission and performs precoding using the predetermined precoder, thereby suppressing quality degradation with a high possibility. In an example shown in FIG. 6, a precoder for transmitting data through specific antennas is used until the N-th retransmission as described above. Accordingly, focusing on a channel corresponding to the antenna, an amplitude is attenuated over time. In an example shown in FIG. 6, a precoder for retransmitting data through all transmitting antennas is used in the (N+1)-th retransmission. This can provide a greater antenna diversity effect and improve quality degradation.

In FIG. 6, the precoder used after the (N+1)-th retransmission has an element equal to 1 for the third antenna and an element equal to −1 for the fourth antenna in case 1, and has an element equal to 1 for the third antenna and an element equal to −j for the fourth antenna in case 2. Accordingly, phase rotation is applied to only a signal assigned to the fourth antenna. Applying different phase rotation to signals in the same layer prevents an influence due to the production of the directivity having higher sensitivity in a specific direction.

In view of the above, codeword generating section 108 encodes a data sequence to generate a CW in the present embodiment. Precoding section 113 precodes the CW using a precoder. Transmitting process section 115 transmits the precoded CW. RF receiving section 101 receives a response resource (PHICH) to which a response signal indicating a retransmission request for the CW is assigned. Retransmission number counting section 105 counts retransmission request number L with respect to the same CW. Predetermined-precoder instructing section 106 instructs a precoder to be switched when retransmission request number L reaches N. Accordingly, it is possible to switch a precoder reported for the first transmission data through PDCCH, thereby suppressing quality degradation associated with a channel variation, which is caused by using the precoder reported for the first transmission data for a long time.

PDCCH generating section 211 identifies a precoder used in the terminal based on the result of the comparison between retransmission request number L with precoder switch retransmission request number N with respect to the same CW and allocates resources to a plurality of terminals based on the identified precoder. Accordingly, resources are adequately allocated to each terminal in application of multiuser MIMO.

Although an operation which reports transmission parameters including resource allocation information from the base station through PDCCH is defined as the first transmission, but the first transmission is not limited thereto, and an operation may be applicable which instructs data to be retransmitted through PHICH after transmission parameters are reported through PDCCH in retransmitting previously transmitted data.

Embodiment 2

In Embodiment 1, a case has been described where a precoder is switched based on variation time of a channel condition which is estimated beforehand. In the present embodiment, a case will be described where a precoder is switched at any optimal timing based on a channel condition.

Figure 7:
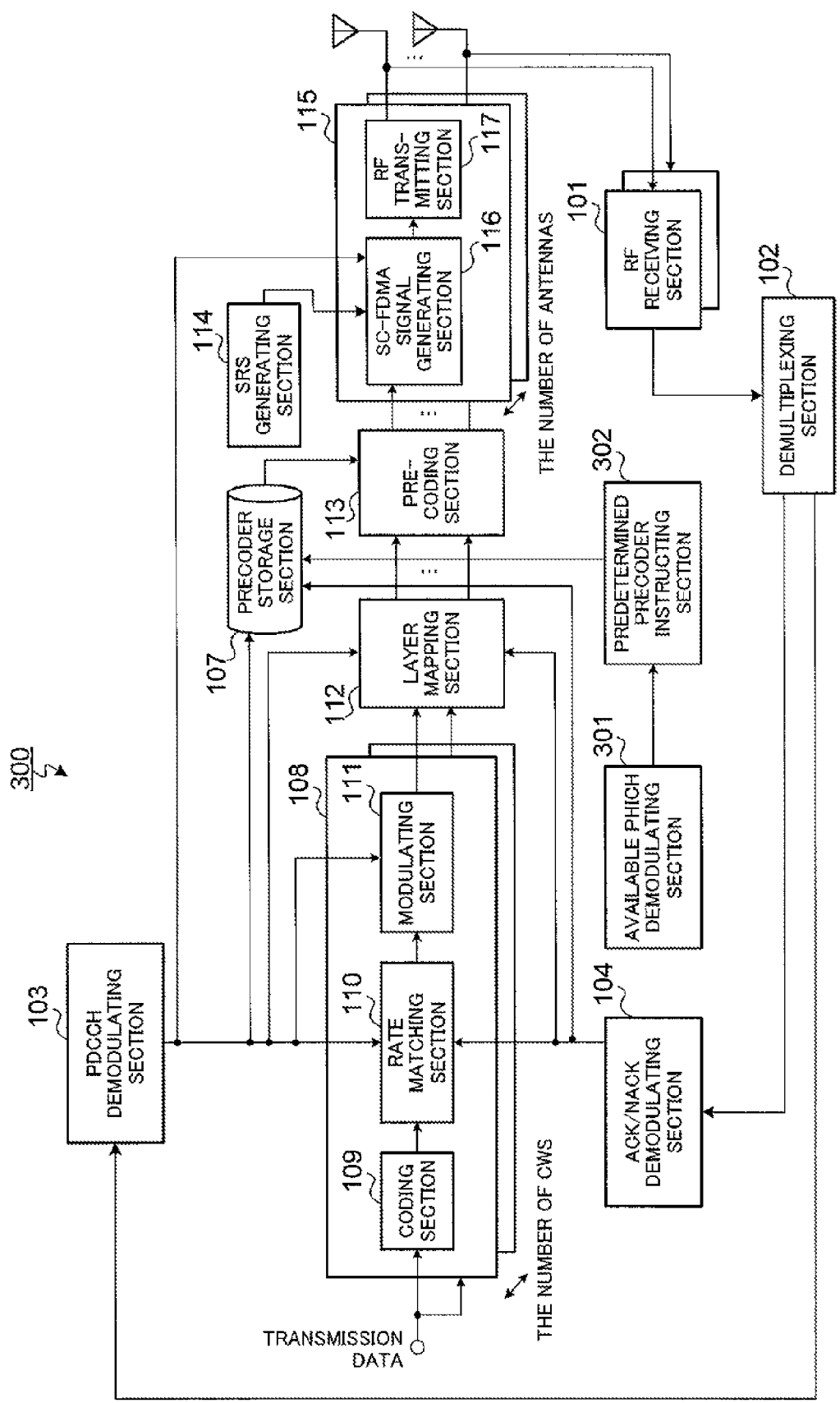
FIG. 7 is a block diagram showing a configuration of main components of a transmitting apparatus according to Embodiment 2 of the present invention.

FIG. 7 is a block diagram showing a configuration of main components of a transmitting apparatus according to the present embodiment. In the transmitting apparatus according to the present embodiment in FIG. 7, components in FIG. 7 common to FIG. 4 are assigned the same reference numerals as in FIG. 4, and descriptions thereof are omitted here. Transmitting apparatus 300 in FIG. 7 is configured to include available PHICH demodulating section 301 and predetermined-precoder instructing section 302 instead of retransmission number counting section 105 and predetermined-precoder instructing section 106, compared to transmitting apparatus 100 in FIG. 4.

Available PHICH demodulating section 301 receives ACK/NACK information for each CW from ACK/NACK demodulating section 104. When only one CW corresponds to an ACK, available PHICH demodulating section 301 stores, in the interior, information on an ACK/NACK resource provided for the CW in PHICH, as an available resource. Available PHICH demodulating section 301 monitors the available resource in next retransmission, and extracts bit information allocated to the available resource.

Available PHICH demodulating section 301 determines whether or not a switching instruction signal is reported, based on the extracted bit information. The switching instruction signal instructs a precoder to be switched from a precoder used in the previous transmission to a predetermined precoder.

To be more specific, when bit information is 1, available PHICH demodulating section 301 determines that the switching instruction signal is reported from the base station. When bit information is 0, available PHICH demodulating section 301 determines that the switching instruction signal is not reported from the base station. In view of the above, available PHICH demodulating section 301 determines whether or not the switching instruction signal is reported, as a precoder switch monitoring section.

Available PHICH demodulating section 301 outputs the result of determination whether or not the switching instruction signal is reported, to predetermined-precoder instructing section 302.

Predetermined-precoder instructing section 302 stores, in the interior, precoder information which is previously determined between the terminal and the base station separately, as with predetermined-precoder instructing section 106. When available PHICH demodulating section 301 determines that the switching instruction signal is reported, predetermined-precoder instructing section 302 determines that the transmitting apparatus acquires the instruction signal for switching and outputs precoder information to precoder storage section 107 to switch a precoder.

Thereafter, transmitting apparatus 300 switches a precoder to a predetermined precoder and performs precoding using the predetermined precoder, as with Embodiment 1.

Figure 8:
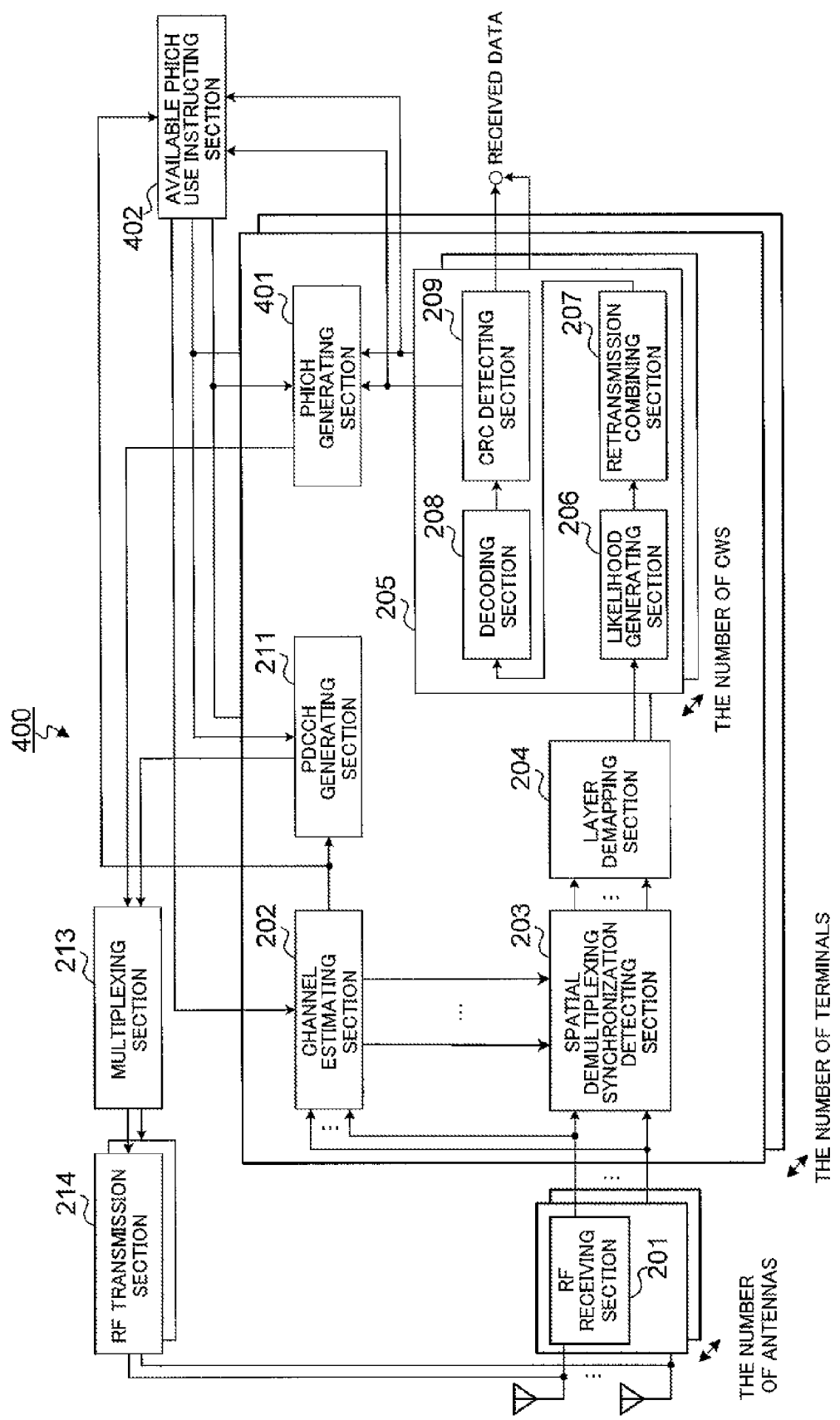
FIG. 8 is a block diagram showing a configuration of main components of a receiving apparatus according to Embodiment 2.

FIG. 8 is a block diagram showing a configuration of main components of a receiving apparatus according to the present embodiment. In the receiving apparatus according to the present embodiment in FIG. 8, components in FIG. 8 common to FIG. 5 are assigned the same reference numerals as in FIG. 5, and descriptions thereof are omitted here. Receiving apparatus 400 in FIG. 8 is configured to include PHICH generating section 401 and available PHICH use instructing section 402 instead of PHICH generating section 212 and retransmission number counting section 210, compared to receiving apparatus 200 in FIG. 5.

PHICH generating section 401 stores information on an ACK/NACK resource corresponding to a CW for which an ACK is previously transmitted as the result of error detection, among PHICH resources, as information on an available PHICH resource. When an instruction for switching a precoder is reported from available PHICH use instructing section 402 described later, PHICH generating section 401 allocates the instruction signal for switching a precoder to the available PHICH resource. To be more specific, PHICH generating section 401 allocates 1 to the available PHICH resource as bit information. When the instruction for switching a precoder is not reported from available PHICH use instructing section 402, PHICH generating section 401 allocates 0 to the available PHICH resource as bit information.

Available PHICH use instructing section 402 receives a channel estimation value from channel estimating section 202. Available PHICH use instructing section 402 monitors the variation in a channel condition from the channel estimation value. Available PHICH use instructing section 402 determines whether or not to switch a precoder based on the variation in the channel condition. For example, available PHICH use instructing section 402 determines that the switch of the precoder is required due to a channel variation, when a reception power decreases by a power exceeding a predetermined value from reception power of at least one of the previous subframes and the variation in the channel condition is equal to or more than a predetermined variation. Available PHICH use instructing section 402 determines whether or not to switch the precoder based on the variation in the channel condition, as a precoder switch determining section.

When determining that the precoder need to be switched available PHICH use instructing section 402 reports an instruction for switching a precoder to PHICH generating section 401. At this time, available PHICH use instructing section 402 also reports information on the switched precoder which is used by a terminal for next transmission, to PDCCH generating section 211 in at least one of the other terminals.

Accordingly, PDCCH generating section 211 in at least one of the other terminals estimate an interference value from the terminal, using information on the latest switched precoder, and can flexibly sets transmission parameters in application of multiuser MIMO.

According to the present embodiment, the base station monitors the variation in the channel condition between channel condition H {n−(4+α)} and channel condition H {n+8m}. When the variation is large, the base station determines to switch a precoder used by the terminal on and after the m+1-th retransmission. The base station reports an instruction signal for switching a precoder to the terminal, using the available PHICH. A method of reporting the instruction signal for switching a precoder will be described with reference to FIG. 9.

Figure 9:
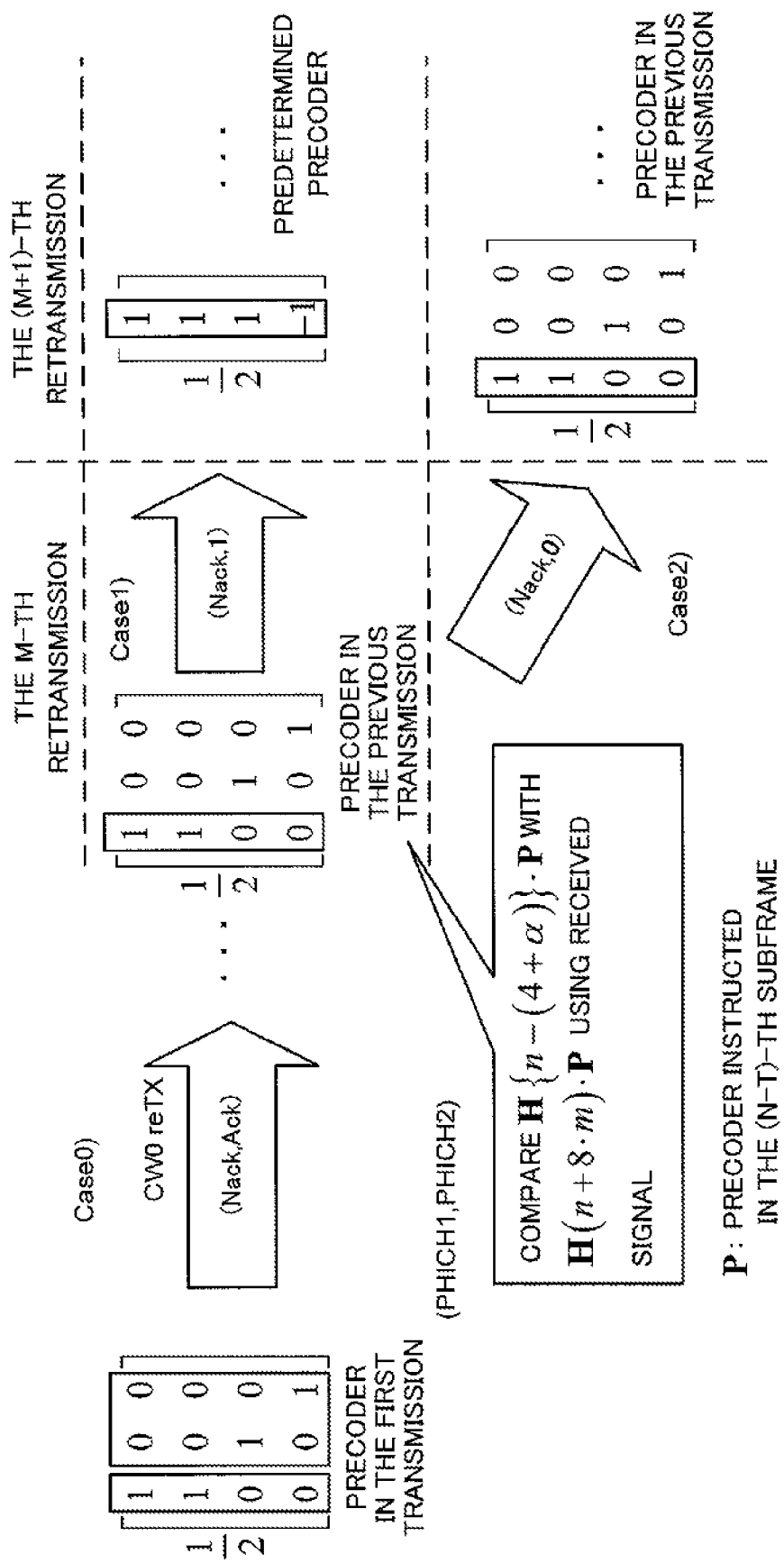
FIG. 9 illustrates a method of reporting an instruction signal for switching a precoder.

Case 0 in FIG. 9 illustrates a process for instruction for switching a precoder when the base station demodulates transmission data (CW0 and CW1) transmitted from the terminal, and results in success in demodulation of only CW1 and failure in demodulation of CW0. In case 1 in FIG. 9, 1 is allocated to an ACK/NACK resource corresponding to CW1 ((NACK, 1)) when the base station could not demodulate CW0. In case 2, 0 is allocated to an ACK/NACK resource corresponding to CW1 ((NACK, 0)) when the base station could not demodulate CW0.

In case 1, the terminal uses the same precoder (the framed portion in FIG. 9) as one for Layer 1 used for corresponding CW0 until the m-th retransmission, and switches the precoder to a predetermined precoder on and after the m+1-th retransmission.

In case 2, the terminal uses the same precoder (the framed portion in FIG. 9) as one for Layer 2 and Layer 3 used for corresponding CW1 until the m-th retransmission, and switches the precoder to the precoder in the previous transmission on and after the m+1-th retransmission.

In view of the above, the base station reports, to the terminal, an instruction signal for switching a precoder used on and after the m+1-th retransmission using an available PHICH resource. Accordingly, the base station can adaptively report, to the terminal, an instruction signal for switching a precoder depending on a channel condition without adding new signaling, which can suppress quality degradation associated with a channel variation.

According to the present embodiment, available PHICH demodulating section 301 stores resource information on an ACK/NACK resource corresponding to a CW with response of an ACK, as information on an available PHICH resource. Available PHICH demodulating section 301 monitors the available PHICH resource upon request on retransmission of the CW and extracts bit information reported through the available PHICH resource. Available PHICH demodulating section 301 determines whether or not a switching instruction signal is reported, based on the bit information reported through the available PRICE resource. Predetermined-precoder instructing section 302 switches a precoder when it is determined that the switching instruction signal is reported.

Available PHICH use instructing section 402 determines whether or not to switch the precoder based on the variation in a channel condition. PHICH generating section 401 allocates an instruction signal for switching a precoder to an available PHICH resource when it is determined that a precoder is switched. Accordingly, it is possible to adaptively change a precoder depending on a channel condition between a base station and a terminal, thereby suppressing quality degradation associated with a channel variation.

Embodiment 3

In Embodiment 1 and Embodiment 2, an example case has been described where signals in the same layer are simultaneously transmitted from a plurality of antennas when a predetermined precoder is used. Accordingly, unintended directivity may be produced to degrade receiving quality, depending on a channel condition.

According to the present embodiment, a case will be described where signals including different cyclic delays for respective antennas are simultaneously transmitted from the antennas. This equivalently increases the number of delay paths and therefore provides an effect of frequency diversity (or CDD: Cyclic Delay Diversity) which increases selectivity of a fading channel.

Figure 10:
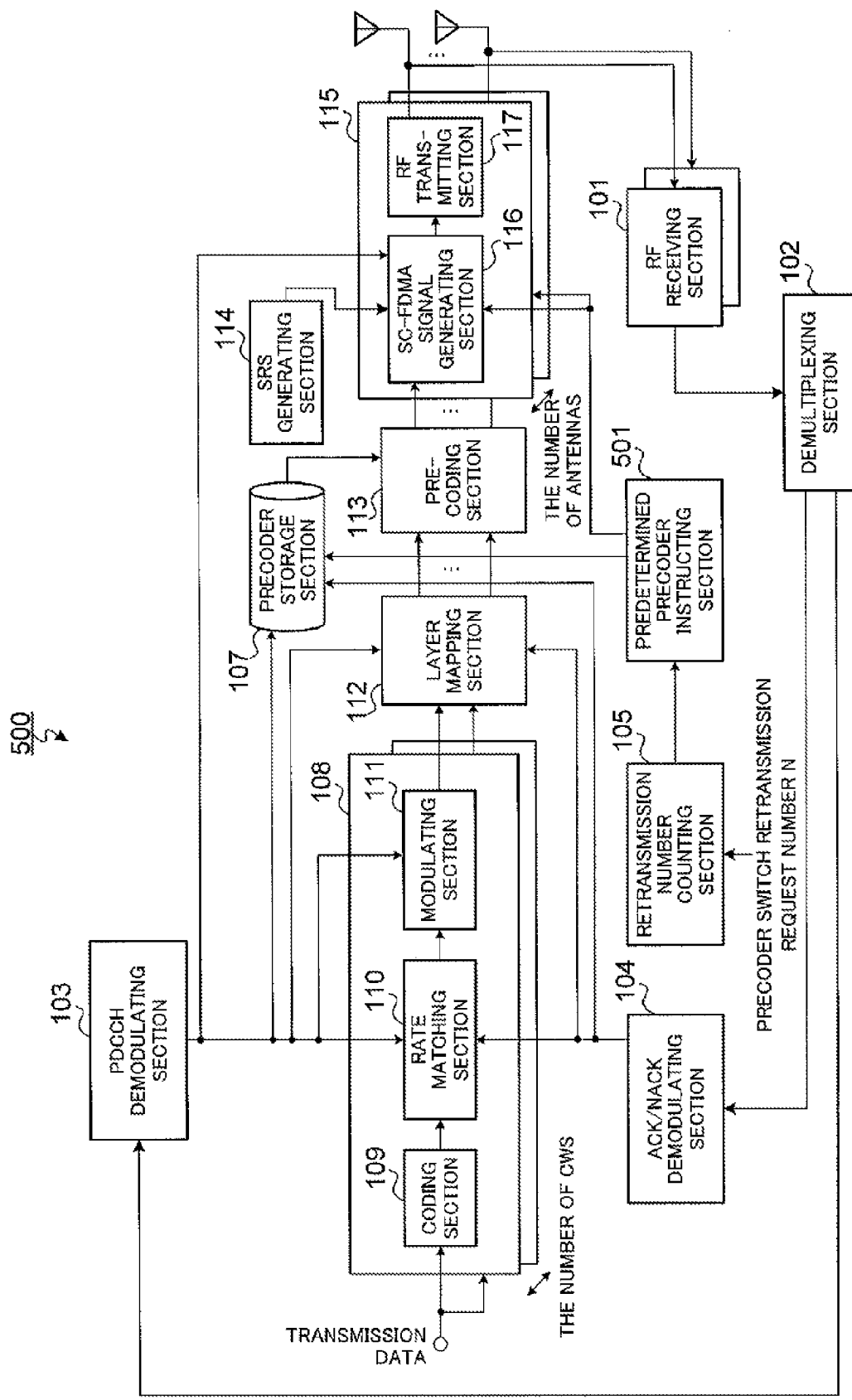
FIG. 10 is a block diagram showing a configuration of main components of a transmitting apparatus according to Embodiment 3 of the present invention.

FIG. 10 is a block diagram showing a configuration of main components of a transmitting apparatus according to the present embodiment. In the transmitting apparatus according to the present embodiment in FIG. 10, components in FIG. 10 common to FIG. 4 are assigned the same reference numerals as in FIG. 4, and descriptions thereof are omitted here. Transmitting apparatus 500 in FIG. 10 is configured to include predetermined-precoder instructing section 501 instead of predetermined-precoder instructing section 106, compared to transmitting apparatus 100 in FIG. 4.

Predetermined-precoder instructing section 501 stores, in the interior, preeoder information which is previously determined between the terminal and the base station separately, as with predetermined-precoder instructing section 106. Predetermined-precoder instructing section 501 outputs the precoder information to precoder storage section 107 to switch a precoder when an instruction signal for switching the precoder is reported from retransmission number counting section 105.

Predetermined-precoder instructing section 501 further applies a cyclic delay corresponding to the amount of delay corresponding to an antenna number, to SC-FDMA signal generating section 116 corresponding to each antenna. For example, the amount of delay to be applied is set using the number of samples in SC-FDMA signal generating section 116 when SC-FDMA signal generating section 116 is configured to perform M point DFT (Discrete Fourier Transform). To be more specific, predetermined-precoder instructing section 501 sets (L−1) samples as the amount of delay for the L-th antenna.

Figure 11:
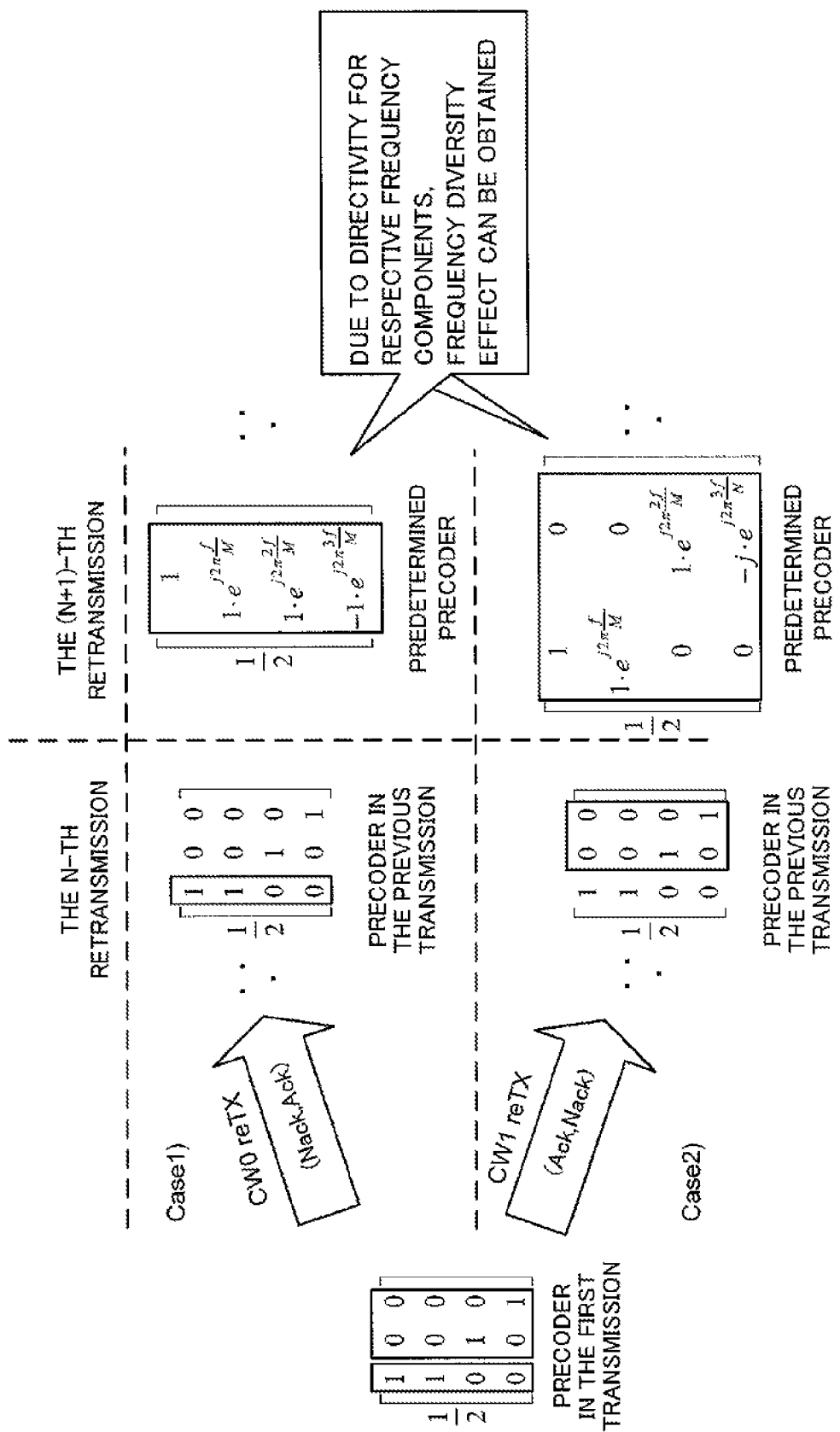
FIG. 11 is a diagram showing a precoder to which phase rotation is applied.

Accordingly, a precoder which is equivalently acquired can be expressed as FIG. 11. In other words, predetermined-precoder instructing section 501 applies phase rotation to a precoder used in precoding section 113. More specifically, focusing on the f-th frequency component of an SC-FDMA signal, phase rotation of $e^{j2\pi fL/M}$ is applied to the L-th antenna. Different phase rotation is applied for each frequency component and each transmitting antenna. Accordingly, it is possible to apply different directivity to each frequency component and equivalently increase the number of delay paths, thereby obtaining an effect of cyclic delay diversity (CDD) which increases selectivity of a fading channel.

The same precoder is assumed to be used for both a reference signal and data which are used for demodulation. The base station can therefore estimate the amount of delay and phase rotation, which are applied in the terminal, using a channel variation acquired through the measurement of a reference signal transmitted from the terminal. The terminal therefore need not separately report information on the amount of delay and phase rotation to the base station.

The main components of the base station according to the present embodiment are common to Embodiment 1, and therefore will be described with reference FIG. 5.

PDCCH generating section 211 estimates a channel condition based on a channel estimation value calculated in channel estimating section 202. PDCCH generating section 211 applies phase rotation to a precoder based on the channel condition. PDCCH generating section 211 then allocates resources to a plurality of terminals, based on the precoder to which the phase rotation is applied.

According to the present embodiment, predetermined-precoder instructing section 501 applies phase rotation to the precoder used in precoding section 113. PDCCH generating section 211 applies phase rotation to the precoder, and allocates resources to a plurality of terminals, based on the precoder to which the phase rotation is applied. Because directivity produced using the precoder differs depending on each frequency component, frequency diversity (or cyclic delay diversity) is acquired and quality degradation associated with a channel variation can be suppressed.

In the above embodiment, a case has been described where a precoder is switched based on variation time of a channel condition which is estimated beforehand. The present embodiment is likewise applicable to a case of switching the precoder based on an actual variation in a channel condition, as described in Embodiment 2

Embodiment 4

In Embodiment 2, a case has been described where a plurality of CWs are allocated in allocation report using a PDCCH. In the present embodiment, a case will be described where a single CW is allocated in the corresponding allocation report.

Figure 12:
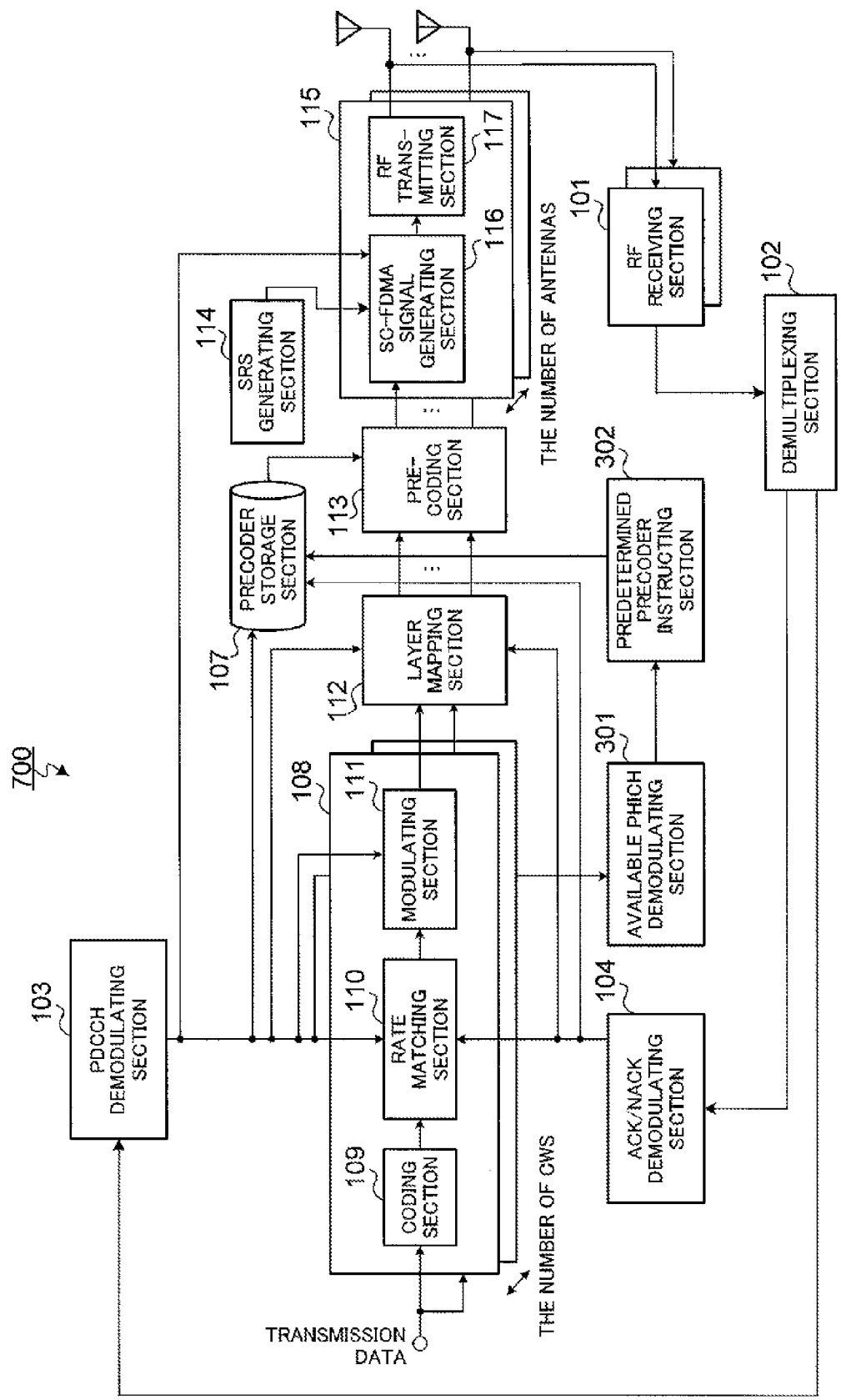
FIG. 12 is a block diagram showing a configuration of main components of a transmitting apparatus according to Embodiment 4 of the present invention.

FIG. 12 is a block diagram showing a configuration of main components of a transmitting apparatus according to the present embodiment. In the transmitting apparatus according to the present embodiment in FIG. 12, components in FIG. 12 common to FIG. 7 are assigned the same reference numerals as in FIG. 7, and descriptions thereof are omitted here. Transmitting apparatus 700 in FIG. 12 is different from transmitting apparatus 300 in FIG. 7 in that available PHICH demodulating section 301 receives a signal from PDCCH demodulating section 103.

To be more specific, available PHICH demodulating section 301 receives information on the number of allocated CWs in transmission parameters from PDCCH demodulating section 103. When the number of allocated CWs is one, available PHICH demodulating section 301 stores, in the interior, information on an ACK/NACK resource provided for the second CW in a PHICH as an available resource. Available PHICH demodulating section 301 monitors the available resource in next retransmission, and extracts bit information allocated to the available resource.

Available PHICH demodulating section 301 determines whether or not a switching instruction signal is reported, as a precoder switch monitoring section as with Embodiment 2. When available PHICH demodulating section 301 determines that the switching instruction signal is reported, predetermined-precoder instructing section 302 determines that the transmitting apparatus acquires the switching instruction signal and outputs precoder information to precoder storage section 107 to switch a precoder, as with Embodiment 2. Thereafter, transmitting apparatus 700 switches a precoder to a predetermined precoder and performs precoding using the predetermined precoder, as with Embodiment 2.

Main components of a receiving apparatus according to the present embodiment will be described with reference to FIG. 8.

PHICH generating section 401 stores information on an ACK/NACK resource corresponding to the second CW in a terminal with a single CW allocation, among PHICH resources as information on an available PHICH resource. When an instruction for switching a precoder is reported from available PHICH use instructing section 402 described later, PHICH generating section 401 allocates the instruction signal for switching a precoder to the available PHICH resource. To be more specific. PHICH generating section 401 allocates 1 to the available PHICH resource as bit information. When the instruction for switching a precoder is not reported from available PHICH use instructing section 402, PHICH generating section 401 allocates 0 to the available PHICH resource as bit information.

According to the present embodiment, the base station monitors the variation in the channel condition between channel condition H {n−(4−α)} and channel condition H {n+8m}, as with Embodiment 2. When the variation is large, the base station determines to switch a precoder used by the terminal on and after the m+1-th retransmission. The base station reports the instruction signal for switching a precoder to the terminal, using the available PHICH. A method of reporting the instruction signal for switching a precoder will be described with reference to FIG. 13.

Figure 13:
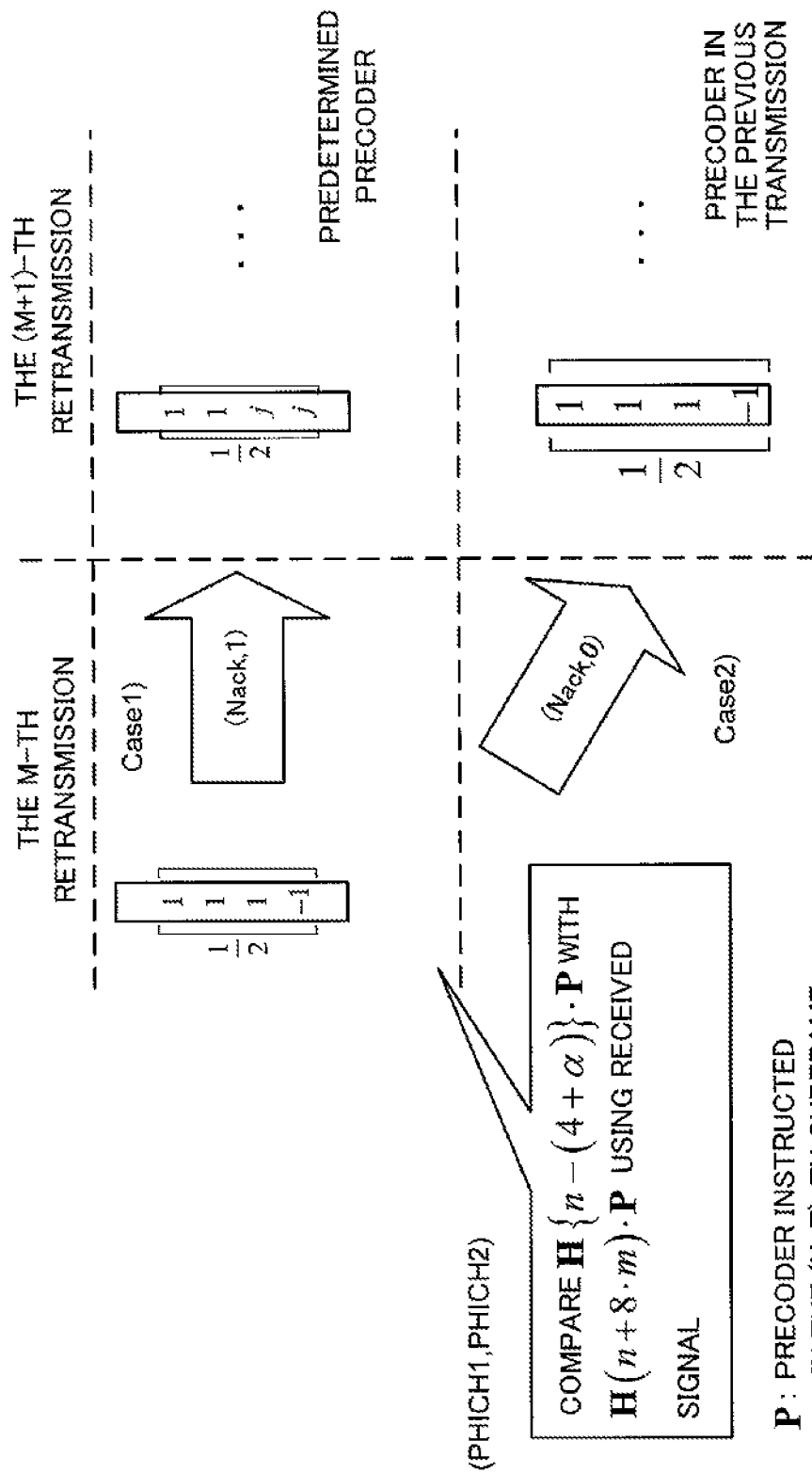
FIG. 13 illustrates a method of reporting an instruction signal for switching a precoder.

Case 1 and case 2 in FIG. 13 illustrates a process for instructing to be switched a precoder when the base station demodulates transmission data (CW) transmitted from the terminal, and results in failure in demodulation of a CW (a case where a response signal is a NACK). In case 1 in FIG. 13, 1 is allocated to an ACK/NACK resource (an available PHICH resource) corresponding to the second CW in the terminal with a single CW allocation ((NACK,1)). In case 2, 0 is allocated to an ACK/NACK resource (an available PHICH resource) corresponding to the second CW in the terminal with a single CW allocation ((NACK,0)).

In case 1, the terminal uses the same precoder (the framed portion in FIG. 13) as one used for the corresponding CW until the m-th retransmission, and switches the precoder to a predetermined precoder, on and after the m+1-th retransmission.

In case 2, the terminal uses the same precoder (the framed portion in FIG. 13) as one used for the corresponding CW until the m-th retransmission, and switches the precoder to the precoder used in the previous transmission, on and after the m+1-th retransmission.

In view of the above, the base station reports an instruction signal for switching a precoder used on and after the m+1-th retransmission to the terminal, using an available PHICH resource. Accordingly, the base station can adaptively report, to the terminal, an instruction signal for switching a precoder depending on a channel condition without adding new signaling, which can suppress quality degradation associated with a channel variation.

According to the present embodiment, when the number of allocated CWs is one, available PHICH demodulating section 301 stores information on the ACK/NACK resource provided for the second CW in a PHICH as information on an available PHICH resource. Accordingly, available PHICH demodulating section 301 stores resource information on an ACK/NACK resource (an ACK/NACK resource provided for the second CW) other than an ACK/NACK resource (an ACK/NACK resource provided for the first CW) to which a response signal to a single CW is allocated. In other words, available PHICH demodulating section 301 stores resource information on an ACK/NACK resource to which a response signal to a single CW is not allocated (an ACK/NACK resource provided for the second CW) in ACK/NACK resources provided for each CW.

Available PHICH demodulating section 301 monitors the available PHICH resource upon request of retransmission of the CW and extracts bit information reported through the available PHICH resource. Available PHICH demodulating section 301 determines whether or not a switching instruction signal is reported, based on the bit information reported through the available PHICH resource. Predetermined-precoder instructing section 302 switches a precoder when it is determined that the instruction signal for switching is reported.

Available PHICH use instructing section 402 determines whether or not to switch the precoder based on the variation in the channel condition. PHICH generating section 401 allocates an instruction signal for switching a precoder to an available PHICH resource when it is determined that a precoder is switched. Accordingly, it is possible to adaptively change a precoder depending on a channel condition between a base station and a terminal, thereby suppressing quality degradation associated with a channel variation.

Figure 14:
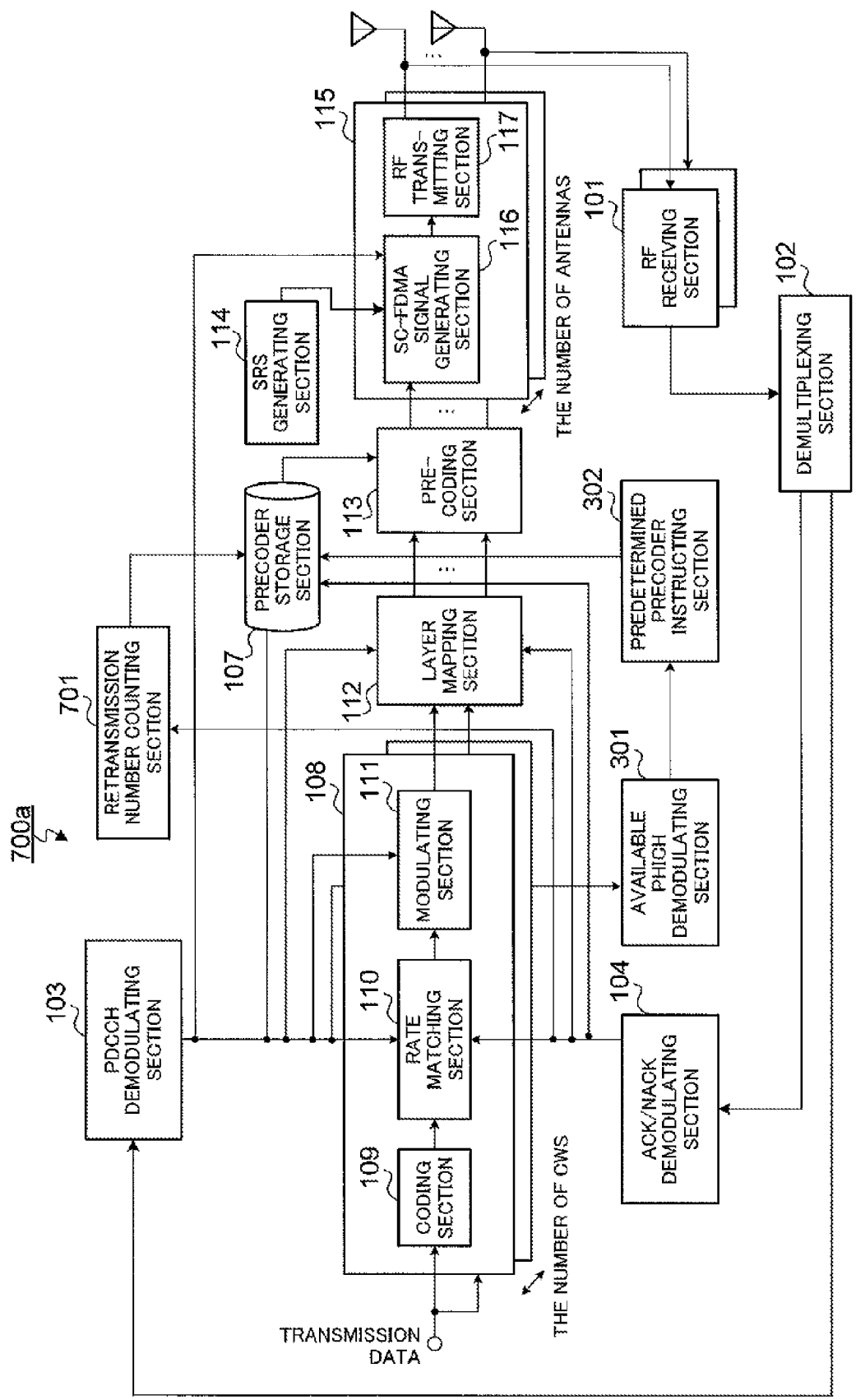
FIG. 14 is a block diagram showing a configuration of main components of another transmitting apparatus according to Embodiment 4 of the present invention.
Figure 15:
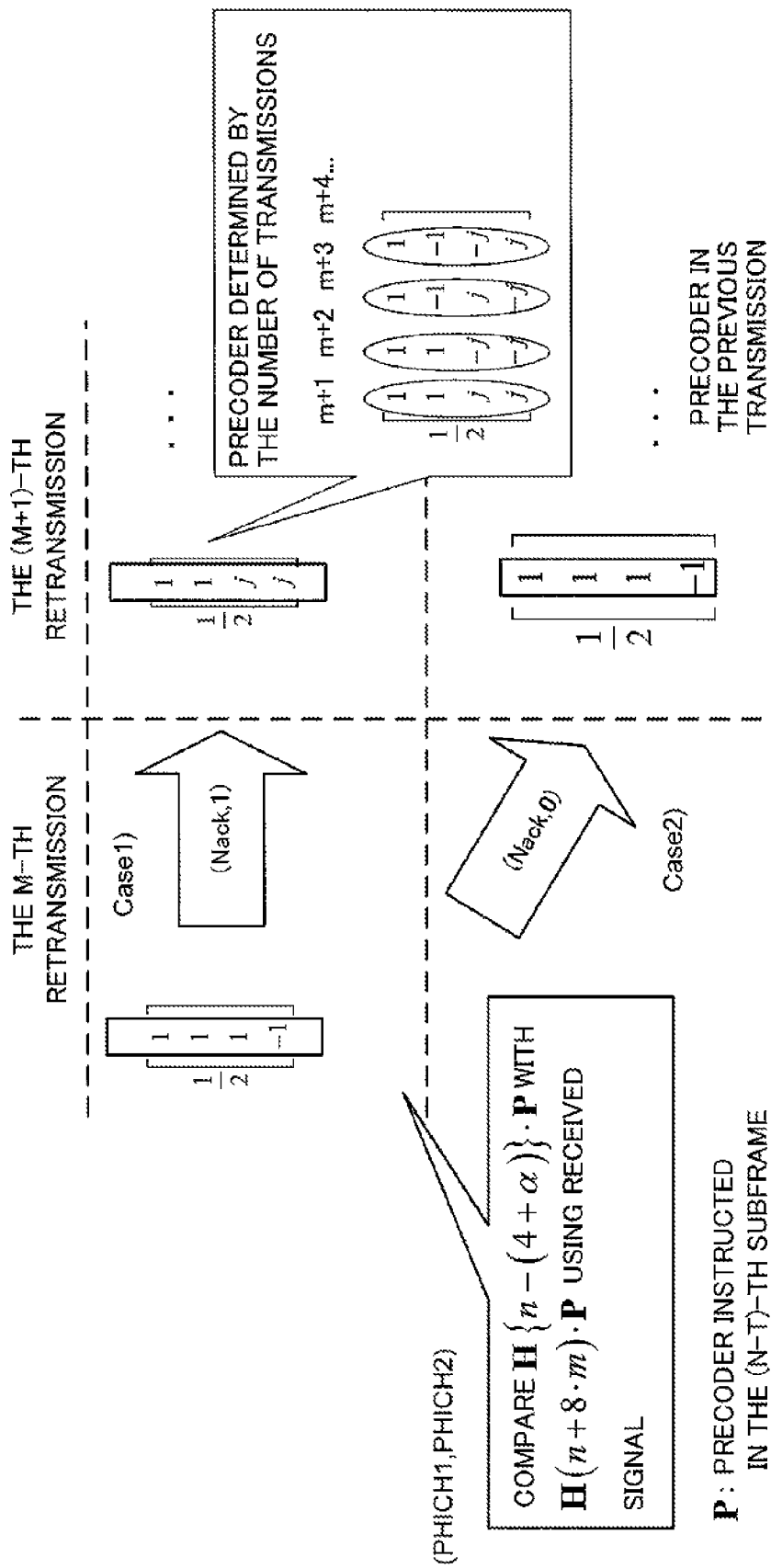
FIG. 15 illustrates a method of switching a precoder.

The present embodiment has been described in a case of using one predetermined precoder, but the precoder may be changed depending on the number of retransmissions. Transmitting apparatus 700a in FIG. 14 further includes, for example, retransmission number counting section 701 compared to the configuration of transmitting apparatus 700 in FIG. 12. When a NACK is outputted from ACK/NACK demodulating section 104 as ACK/NACK information for each CW, retransmission number counting section 701 counts the number of retransmissions for each CW. When switching a precoder to a predetermined precoder based on an instruction from predetermined-precoder instructing section 302, precoder storage section 107 determines a precoder corresponding to the number of retransmissions for each CW, which is inputted from retransmission number counting section 701, among a plurality of predetermined precoders. As shown in FIG. 15, for example, an operation may be employed which sequentially applies a plurality of precoders which are orthogonal to each other, corresponding to the ordinal numbers of retransmissions (the (m+1)-th, the (m+2)-th, the (m+3)-th . . . ) as the predetermined precoder. Accordingly, different signal quality between retransmission packets can be expected by transmitting signals using directivity which differs depending on the number of retransmissions, thereby obtaining a diversity effect.

Embodiment 5

In Embodiment 2, a case has been described where a precoder is switched in transmission parameters set in a PDCCH at any timing. In the present embodiment, a case will be described where a spreading code of a demodulation reference signal (hereinafter, referred to as a DMRS) is switched in the transmission parameters at any timing.

Figure 16:
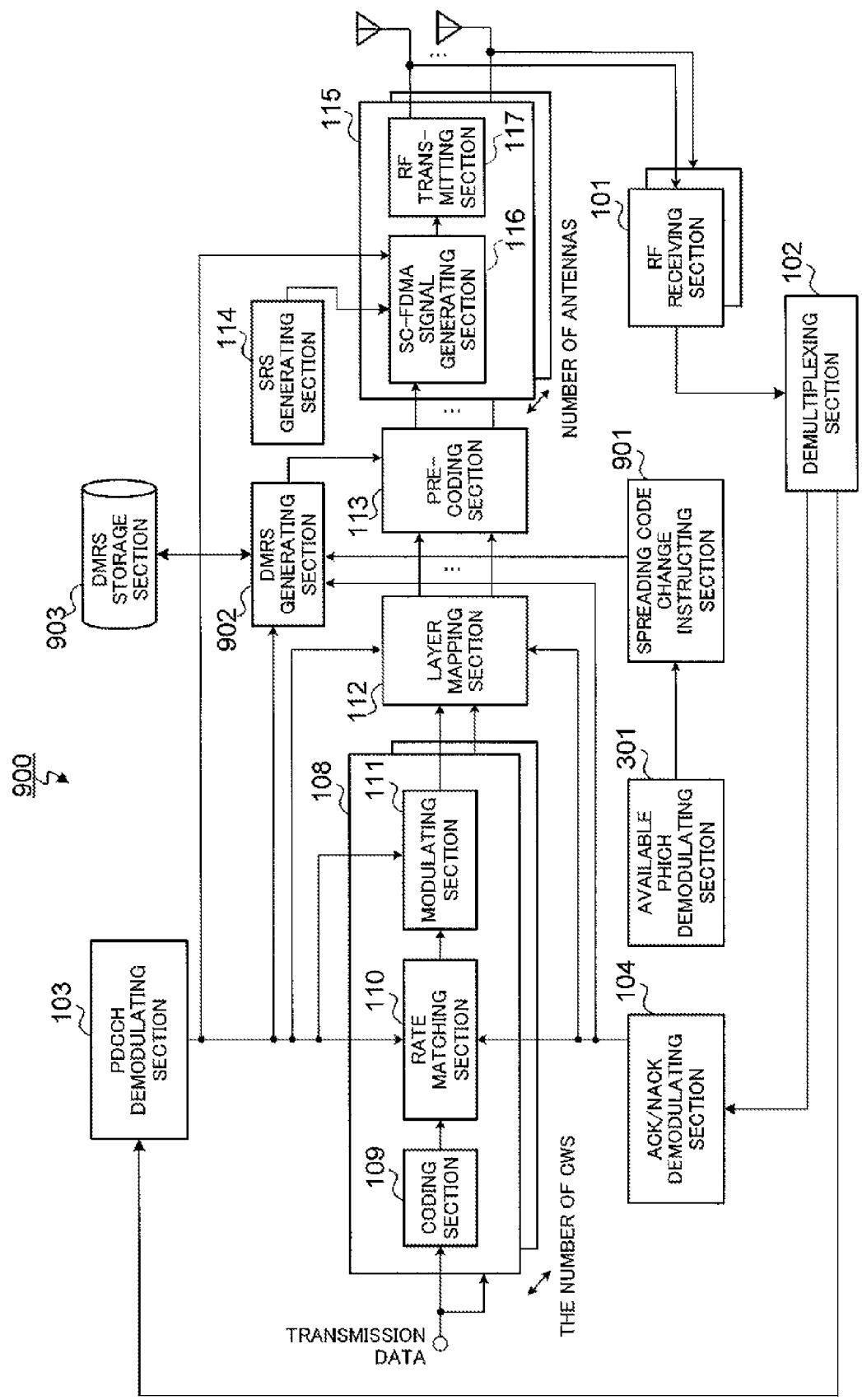
FIG. 16 is a block diagram showing a configuration of main components of a transmitting apparatus according to Embodiment 5 of the present invention.

FIG. 16 is a block diagram showing a configuration of main components of a transmitting apparatus according to the present embodiment. In the transmitting apparatus according to the present embodiment in FIG. 16, configuration parts in FIG. 16 common to FIG. 7 are assigned the same reference numerals as in FIG. 7, and descriptions thereof are omitted here. Transmitting apparatus 900 in FIG. 16 is configured to include spreading code change instructing section 901 instead of predetermined-precoder instructing section 302, DMRS generating section 902 instead of precoder storage section 107, and DMRS storage section 903, compared to transmitting apparatus 300 in FIG. 7.

Available PHICH demodulating section 301 receives ACK/NACK information for each CW from ACK/NACK demodulating section 104, as with Embodiment 2. When only one CW corresponds to an ACK, available PHICH demodulating section 301 stores, in the interior, information on an ACK/NACK resource provided for the CW in a PHICH, as an available resource. Available PHICH demodulating section 301 monitors the available resource in next retransmission, and extracts bit information allocated to the available resource.

Available PHICH demodulating section 301 determines whether or not a signal for changing a spreading code is reported, based on the extracted bit information. Herein, the signal for changing a spreading code is an instruction signal for instructing a spreading code applied to a DMRS (a demodulation reference signal) to be sequentially changed in accordance with a prescribed rule.

DMRS generating section 902 generates DMRSs corresponding to each layer in accordance with a spreading code of a demodulation reference signal in the transmission parameters indicated from PDCCH demodulating section 103. DMRS generating section 902 outputs the generated signals (DMRS) to precoding section 113. Precoding section 113 sets signals outputted from layer mapping section 112 or the DMRS as signals corresponding to each layer.

DMRS storage section 903 receives a spreading code of the DMRSs indicated from PDCCH demodulating section 103, from DMRS generating section 902 and stores the spreading code.

Thereafter, available PHICH demodulating section 301 determines whether or not the signal for changing a spreading code is reported, as a spreading code change monitoring section, as with Embodiment 2. When available PHICH demodulating section 301 determines that the signal for changing a spreading code is reported, spreading code change instructing section 901 determines that the transmitting apparatus acquires the signal for changing a spreading code and outputs the signal for changing a spreading code to DMRS generating section 902 to change the spreading code of the DMRSs.

To be more specific, when receiving the signal for changing a spreading code from spreading code change instructing section 901, DMRS generating section 902 acquires a spreading code sequentially changed in accordance with a prescribed rule related to the correspondence between a spreading code and a layer, among spreading codes of the DMRSs which are indicated from PDCCH demodulating section 103 and stored in DMRS storage section 903.

DMRS generating section 902 generates a DMRS which corresponds to each layer, using the acquired spreading code and outputs the generated DMRS to precoding section 113.

Figure 17:
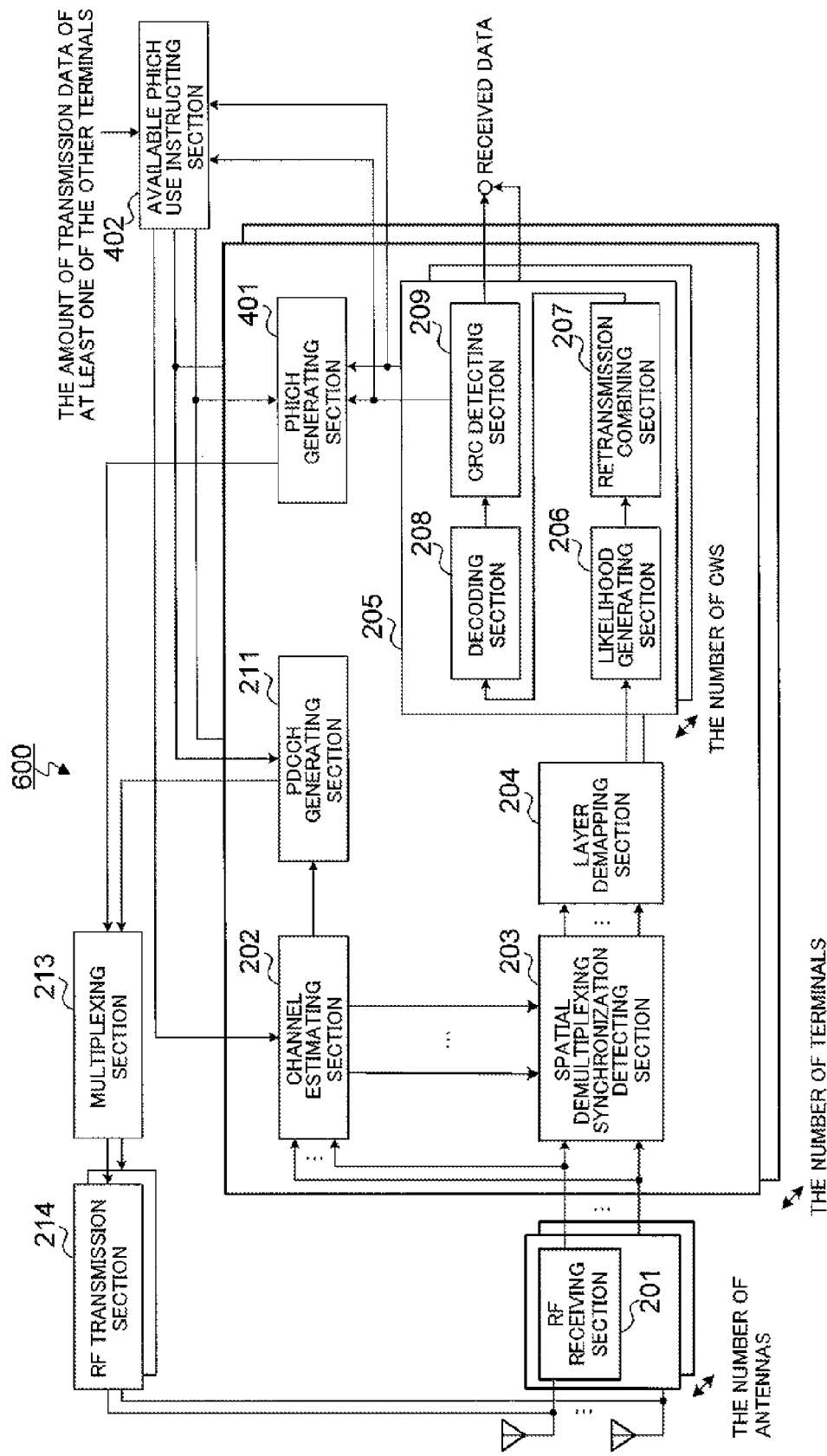
FIG. 17 is a block diagram showing a configuration of main components of a receiving apparatus according to Embodiment 5 of the present invention.

FIG. 17 is a block diagram showing a configuration of main components of a receiving apparatus according to the present embodiment. In the receiving apparatus according to the present embodiment in FIG. 17, configuration parts in FIG. 17 common to FIG. 8 are assigned the same reference numerals as in FIG. 8, and descriptions thereof are omitted here. Receiving apparatus 600 in FIG. 17 is different from receiving apparatus 400 in FIG. 8 in that channel estimating section 202 receives a signal from available PHICH use instructing section 402.

PHICH generating section 401 stores, as information on an available PHICH resource, information on an ACK/NACK resource corresponding to a CW which corresponds to an ACK previously transmitted as the result of error detection, among PHICH resources as with Embodiment 2. When an instruction for changing a spreading code is reported from available PHICH use instructing section 402 described later, PHICH generating section 401 allocates the signal for changing a spreading code to the available PHICH resource. To be more specific, PHICH generating section 401 allocates 1 to an available PHICH resource as bit information. When the instruction for changing a spreading code is not reported from available PHICH use instructing section 402, PHICH generating section 401 allocates 0 to the available PHICH resource as bit information.

Available MUCH use instructing section 402 monitors the amount of transmission data of at least one of the other terminals from a scheduler section (not shown). Available PHICH use instructing section 402 determines whether or not to change a spreading code, based on the amount of transmission data of at least one of the other terminals. For example, when the amount of transmission data of at least one of the other terminals is larger than a predetermined value, available PHICH use instructing section 402 determines that at least one of the other terminals needs to be allocated to the corresponding resource and a spreading code needs to be changed. Available PHICH use instructing section 402 determines whether or not to change the spreading code, based on the amount of transmission data of at least one of the other terminals as a spreading code change determining section.

When determining that the spreading code needs to be changed, available PHICH use instructing section 402 reports an instruction for changing a spreading code to PHICH generating section 401. Available PHICH also use instructing section 402 reports information on the changed spreading code used for next transmission by the corresponding terminal, to channel estimating section 202 of the terminal and PDCCH generating section 211 of at least one of the other terminals.

PDCCH generating section 211 of at least one of the other terminals can thereby estimate an interference value from the terminal, using information on the latest switched spreading code and flexibly set transmission parameters even in the application of multiuser MIMO.

According to the present embodiment, the base station monitors the amount of transmission data of each terminal. When the amount of transmission data of at least one of the other terminals is larger than a predetermined value, the base station determines to change a spreading code used by one terminal on and after the m+1-th retransmission. The base station reports a signal for changing a spreading code to the terminal, using an available PHICH. A method of reporting the signal for changing a spreading code will be described with reference to FIG. 18.

Figure 18:
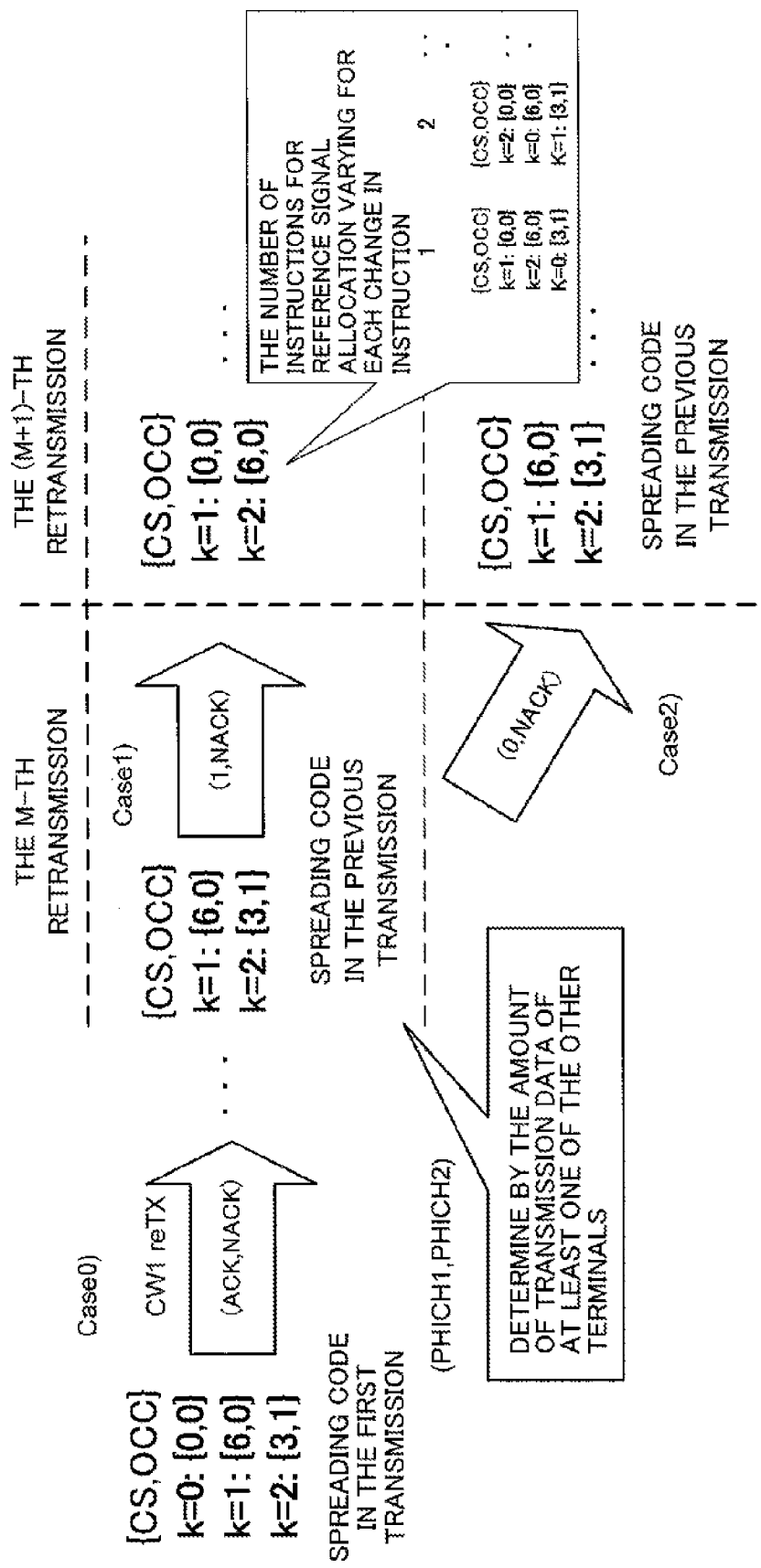
FIG. 18 illustrates a method of reporting a signal for changing a spreading code.

FIG. 18 shows a case of transmission in rank 3 (i.e. transmission using 3 layers). In the transmission, CW0 is allocated to Layer 0 (k=0), and CW1 is allocated to Layer 1 (k=1) and Layer 2 (k=2), In FIG. 18, a spreading code of a DMRS is defined by a cyclic shift sequence and an orthogonal cover code (OCC) which is orthogonal to other OCCs, the cyclic shift sequence being separable from other cyclic shift sequences since having a different amount of cyclic shift from those of the others. In FIG. 18, for example, the amount CS of cyclic shift in a cyclic shift sequence is 0 to 11, and OCCs are two codes which are different each other (the two codes are represented by 0 and 1). In FIG. 18, spreading codes {CS, OCC} defined by the amount CS of cyclic shift and the OCC in the first transmission of Layers 0 to 2 (k=0 to 2) are respectively set to {0,0}, {6,0}, and {3,1}.

In FIG. 18, case 0 shows a process for instructing a spreading code to be changed when the base station demodulates transmission data (CW0 and CW1) transmitted from the terminal, and results in success in demodulation of only CW0 and failure in demodulation of CW1 ((ACK, NACK)). In case 1 in FIG. 18, 1 is allocated to an ACK/NACK resource corresponding to CW0 ((1, NACK)) when the base station could not demodulate CW1. In case 2, 0 is allocated to an ACK/NACK resource corresponding to CW0 ((0, NACK)) when the base station could not demodulate CW1.

In case 1, the terminal uses spreading codes ({6,0}, {3,1}) for Layer 1 and Layer 2, which are used for corresponding CW1 without modification, until the m-th retransmission. On the other hand, the terminal changes the spreading codes into predetermined spreading codes (k=1: {0,0} and k=2: {6,0} in FIG. 18) determined depending on the number of instructions for changing a spreading code on and after the m+1-th retransmission.

In case 2, the terminal uses spreading codes ({6,0}, {3,1}) for Layer 1 and Layer 2, which are used for corresponding CW1 without modification, until the m-th retransmission, and switches the spreading codes to the spreading codes in the previous transmission ({6,0}, {3,1}) on and after the m+1-th retransmission.

Accordingly, the base station reports a signal for changing a spreading code, which is used on and after the m+1-th retransmission to the terminal, using the available PHICH resource. The base station can adaptively report a signal for changing a spreading code to the terminal, depending on the amount of transmission data of at least one of the other terminals without adding new signaling, which can suppress quality degradation associated with the interference between reference signals of users.

Embodiments of the present invention have been described above.

Although the present invention has been described above with embodiments using antennas, the present invention is equally applicable to antenna ports.

An antenna port refers to a theoretical antenna comprised of one or a plurality of physical antennas. In other words, "antenna port" does not necessarily refer to one physical antenna, but may refer to an array antenna and so forth composed of a plurality of antennas.

For example, 3 GPP LTE does not define how many physical antennas an antenna port is formed with, but defines that an antenna port is the minimum unit for transmitting different reference signals in a base station.

In addition, an antenna port may be defined as a minimum unit for multiplying a precoding vector as weighting.

Although an example of the present invention configured as hardware has been described in the present embodiments, the present invention may also implement software in collaboration with hardware.

Furthermore, each function block employed in the above descriptions of embodiments may typically be implemented as an LSI constituted by an integrated circuit. These may be implemented individually as single chips, or a single chip may incorporate some or all of the function blocks "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI production, utilization of an FPGA (Field Programmable Gate Array) or a reconfigurable processor where connections and settings of circuit cells in an LSI can be reconfigured may also be possible.

In the event of the introduction of a circuit implementation technology whereby LSI is replaced by a different technology, which is advanced in or derived from semiconductor technology, integration of the function blocks may of course be performed using technology therefrom. An application to biotechnology and/or the like is also possible.

The disclosures of Japanese Patent Application No. 2010-140746, filed on Jun. 21, 2010, and Japanese patent application No. 2010-181343, filed on Aug. 13, 2010, including the specifications, drawings and abstracts, are incorporated herein by reference in their entireties.

INDUSTRIAL APPLICABILITY

A terminal apparatus, a base station apparatus, a retransmission, method, and a resource allocation method according to the present invention are suitable for performing a method of controlling retransmission using non-adaptive HARQ in radio communication system using a MEMO communication technique.

REFERENCE SIGNS LIST 100, 300, 500, 700, 700a, 900 Transmitting apparatus
101, 201 RF receiving section
102 Demultiplexing section
103 PDCCH demodulating section
104 ACK/NACK demodulating section
105 Retransmission number counting section
106, 302, 501 Predetermined-precoder instructing section
107 Precoder storage section
108 Codeword generating section
109 Coding section
110 Rate matching section
111 Modulating section
112 Layer mapping section
113 Precoding section
114 SRS generating section
115 Transmitting process section
116 SC-FDMA signal generating section
117, 214 RF transmitting section
200, 400, 600 Receiving apparatus
202 Channel estimating section
203 Spatial demultiplexing synchronization detecting section.
204 Layer demapping section
205 Error detecting section
206 Likelihood generating section
207 Retransmission combining section
208 Decoding section
209 CRC detecting section
210, 701 Retransmission number counting section
211 PDCCH generating section
212, 401 PHICH generating section
213 Multiplexing section
301 Available PHICH demodulating section
402 Available PHICH use instructing section
901 Spreading code change instructing section
902 DMRS generating section
903 DMRS storage section.

The invention claimed is:
1. A terminal apparatus comprising:
a codeword generating section that encodes a data sequence to generate codewords;
a receiving section that receives a response signal indicating a retransmission request for the codewords, the response signal being allocated to a response resource;
an instructing section that instructs a precoder to be switched based on the number of retransmission requests for the same codeword or a switch instructing signal reported using the response resource;
a precoding section that precodes the codeword using the precoder, based on the instruction to switch the precoder; and
a transmitting section that transmits the precoded codeword, wherein
(i) a first precoder used before the instructing section instructs the precoder to be switched is a precoder by which transmission data corresponding to the codeword is transmitted through specific antenna ports among a plurality of antenna ports of the terminal apparatus, and
a second precoder used after the instructing section instructs the precoder to be switched is a precoder by which the transmission data is transmitted through all of the plurality of antenna ports, or (ii) the first precoder is a precoder by which phase rotation is not applied to the transmission data transmitted from antenna ports to which the same codeword is assigned, and the second precoder is a precoder by which phase rotation is applied to the transmission data transmitted from antenna ports to which the same codeword is assigned.

2. The terminal apparatus according to claim 1, wherein the instructing section instructs the precoder to be switched when the number of retransmission requests reaches N.

3. The terminal apparatus according to claim 1, wherein the instructing section instructs the precoder to be switched when the terminal apparatus acquires the switch instructing signal.

4. The terminal apparatus according to claim 3, wherein:
the response resource includes an acknowledge/non-acknowledge (ACK/NACK) resource provided for each of the codewords;
the terminal apparatus further comprises a monitor section that stores resource information on the ACK/NACK resource of a first codeword with response of an acknowledgement, monitors the ACK/NACK resource of the first codeword upon request on retransmission of a second codeword, and determines whether the switch instructing signal is reported using the ACK/NACK resource of the first codeword; and
the instructing section instructs the precoder to be switched when it is determined that the switch instructing signal is reported.

5. The terminal apparatus according to claim 3, wherein:
the response resource includes acknowledge/non-acknowledge (ACK/NACK) resources provided for the respective codewords;
the terminal apparatus further comprises a monitor section that stores resource information on a first ACK/NACK resource other than a second ACK/NACK resource to which the response signal to the codeword is allocated, among the ACK/NACK resources, monitors the first ACK/NACK resource upon request on retransmission of the codeword, and determines whether the switch instructing signal is reported using the first ACK/NACK resource; and
the instructing section instructs the precoder to be switched when it is determined that the switch instructing signal is reported.

6. The terminal apparatus according to claim 1, wherein the instructing section instructs phase rotation to be applied to the precoder in the precoding.

7. A base station apparatus comprising:
a receiving section that receives codewords precoded by a precoder;
a detecting section that detects an error of the received codewords;
a response signal generating section that allocates a response signal indicating a result of error detection for the codewords to a response resource; and
a schedule control section that identifies different precoders for a first case of N or fewer retransmission requests for the same codeword and for a second case of N+1 or more retransmission requests, or identifies the different precoders for a third case of a variation in a channel condition less than a predetermined variation and a fourth case of a variation in the channel condition equal to or more than the predetermined variation, and allocates resources to a plurality of terminal apparatuses based on the identified precoder, wherein (i) a first precoder for the first case and for the third case is a precoder by which transmission data corresponding to the codeword is transmitted through specific antenna ports among a plurality of antenna ports of each of the plurality of terminal apparatuses, and
a second precoder for the second case and for the fourth case is a precoder by which the transmission data is transmitted through all of the plurality of antenna ports, or (ii) the first precoder is a precoder by which phase rotation is not applied to the transmission data transmitted from antenna ports to which the same codeword is assigned, and
the second precoder is a precoder by which phase rotation is applied to the transmission data transmitted from antenna ports to which the same codeword is assigned.

8. The base station apparatus according to claim 7, wherein:
the response resource includes ACK/NACK resources provided for the respective codewords;
the base station apparatus further comprises a determining section that determines whether or not to switch the precoder based on a variation in the channel condition; and
the response signal generating section allocates a switch instructing signal for switching the precoder to an ACK/NACK resource to which an acknowledge is allocated as the result of error detection when it is determined that the precoder is switched.

9. The base station apparatus according to claim 7, wherein the schedule control section applies phase rotation to the precoder and allocates resources to a plurality of terminal apparatuses based on the precoder having the applied phase rotation.

10. A method of retransmission comprising:
encoding a data sequence to generate codewords;
receiving a response signal indicating a retransmission request for the codewords, the response signal being allocated to a response resource;
instructing a precoder to be switched based on the number of retransmission requests for the same codeword or a switch instructing signal reported using the response resource;
precoding the codeword using the precoder, based on the instruction to switch the precoder; and
transmitting the precoded codeword, wherein
(i) a first precoder used before the step of instructing the precoder to be switched is a precoder by which transmission data corresponding to the codeword is transmitted through specific antenna ports among a plurality of antenna ports of a terminal apparatus, and
a second precoder used after the step of instructing the precoder to be switched is a precoder by which the transmission data is transmitted through all of the plurality of antenna ports, or
(ii) the first precoder is a precoder by which phase rotation is not applied to the transmission data transmitted from antenna ports to which the same codeword is assigned, and
the second precoder is a precoder by which phase rotation is applied to the transmission data transmitted from antenna ports to which the same codeword is assigned.

11. A method of allocating resources comprising:
receiving codewords precoded by a precoder;
detecting an error of the received codewords;
allocating a response signal indicating a result of error detection for the codewords to a response resource; and identifying different precoders for a first case of N or fewer retransmission requests for the same codeword and for a second case of N+1 or more retransmission requests, or identifying the different precoders for a third case of a variation in a channel condition less than a predetermined variation and a fourth case of a variation in the channel condition equal to or more than the predetermined variation, and allocating resources to a plurality of terminal apparatuses based on the identified precoder, wherein (i) a first precoder for the first case and the third case is a precoder by which transmission data corresponding to the codeword is transmitted through specific antenna ports among a plurality of antenna ports of each of the plurality of terminal apparatuses, and a second precoder for the second case and for the fourth case is a precoder by which the transmission data is transmitted through all of the plurality of antenna ports, or (ii) the first precoder is a precoder by which phase rotation is not applied to the transmission data transmitted from antenna ports to which the same codeword is assigned, and the second precoder is a precoder by which phase rotation is applied to the transmission data transmitted from antenna ports to which the same codeword is assigned.

* * * * *